(12) United States Patent
Shingu

(10) Patent No.: US 11,516,399 B2
(45) Date of Patent: Nov. 29, 2022

(54) IMAGING APPARATUS AND IMAGE STABILIZATION SHARING BETWEEN INTERCHANGEABLE LENS AND CAMERA BODY

(71) Applicant: Panasonic Intellectual Property Management Co., Ltd., Osaka (JP)

(72) Inventor: Yasuhiro Shingu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/286,801

(22) PCT Filed: Oct. 11, 2019

(86) PCT No.: PCT/JP2019/040256
§ 371 (c)(1),
(2) Date: Apr. 19, 2021

(87) PCT Pub. No.: WO2020/095623
PCT Pub. Date: May 14, 2020

(65) Prior Publication Data
US 2021/0360159 A1 Nov. 18, 2021

(30) Foreign Application Priority Data
Nov. 7, 2018 (JP) .............................. JP2018-209891

(51) Int. Cl.
*H04N 5/232* (2006.01)
*G02B 7/14* (2021.01)
(Continued)

(52) U.S. Cl.
CPC ........... *H04N 5/23287* (2013.01); *G02B 7/14* (2013.01); *G02B 27/646* (2013.01); *G03B 5/02* (2013.01);
(Continued)

(58) Field of Classification Search
CPC ........... H04N 5/23287; H04N 5/23258; H04N 5/23267; H04N 5/2328; H04N 5/23209;
(Continued)

(56) References Cited

U.S. PATENT DOCUMENTS

2009/0180770 A1 7/2009 Honjo
2015/0281581 A1 10/2015 Sakurai
(Continued)

FOREIGN PATENT DOCUMENTS

JP H07-104338 A 4/1995
JP H11-101998 A 4/1999
(Continued)

OTHER PUBLICATIONS

International Preliminary Report on Patentability for Corresponding Application No. PCT/JP2019/040256 dated May 20, 2021, English Translation.
(Continued)

*Primary Examiner* — Nicholas G Giles
(74) *Attorney, Agent, or Firm* — Renner, Otto, Boisselle & Sklar, LLP

(57) ABSTRACT

An imaging apparatus includes an interchangeable lens, and a camera body. The interchangeable lens includes a correction lens, a lens driver, and a first controller. The camera body includes an image sensor, a sensor driver, and a second controller. The first or second controller selects one of the interchangeable lens and the camera body, in accordance with a level of correction capability to perform the image stabilization. Corresponding to the selected one, one driver of the lens driver and the sensor driver performs the image stabilization for the image blur within a predetermined range. The other driver corresponding to non-selected one performs the image stabilization for a remaining portion of the image blur exceeding the predetermined range.

9 Claims, 23 Drawing Sheets

(51) Int. Cl.
*G02B 27/64* (2006.01)
*G03B 5/02* (2021.01)
*G03B 17/14* (2021.01)

(52) U.S. Cl.
CPC ......... *G03B 17/14* (2013.01); *H04N 5/23258* (2013.01); *H04N 5/23267* (2013.01); *G03B 2205/0007* (2013.01)

(58) Field of Classification Search
CPC .......... G02B 7/14; G02B 27/646; G03B 5/02; G03B 17/14; G03B 2205/0007
See application file for complete search history.

(56) References Cited

U.S. PATENT DOCUMENTS

| | | |
|---|---|---|
| 2016/0330377 A1 | 11/2016 | Tsuchiya |
| 2019/0230288 A1* | 7/2019 | Tsuchiya ............ H04N 5/23287 |
| 2021/0208416 A1* | 7/2021 | Ohishi ..................... G02B 7/14 |

FOREIGN PATENT DOCUMENTS

| | | |
|---|---|---|
| JP | 2009-251492 A | 10/2009 |
| JP | 2015-141390 A | 8/2015 |
| JP | 2015-194711 A | 11/2015 |
| WO | 2008/010568 A1 | 1/2008 |

OTHER PUBLICATIONS

Reconsideration Report by Examiner before Appeal for corresponding Japanese Application No. 2020-521616 dated Oct. 26, 2021 and its English Machine Translation.
Decision of Refusal for corresponding Japanese Application No. 2020-521616 dated Jul. 6, 2021.
International Search Report for corresponding Application No. PCT/JP2019/040256, dated Dec. 17, 2019.
Japanese Office Action dated Feb. 2, 2021 for the corresponding Japanese Patent Application No. 2020-521616.
Trial and Appeal Decision for corresponding Japanese Application No. 2020-521616 dated Oct. 18, 2022 and its machine translation.

\* cited by examiner

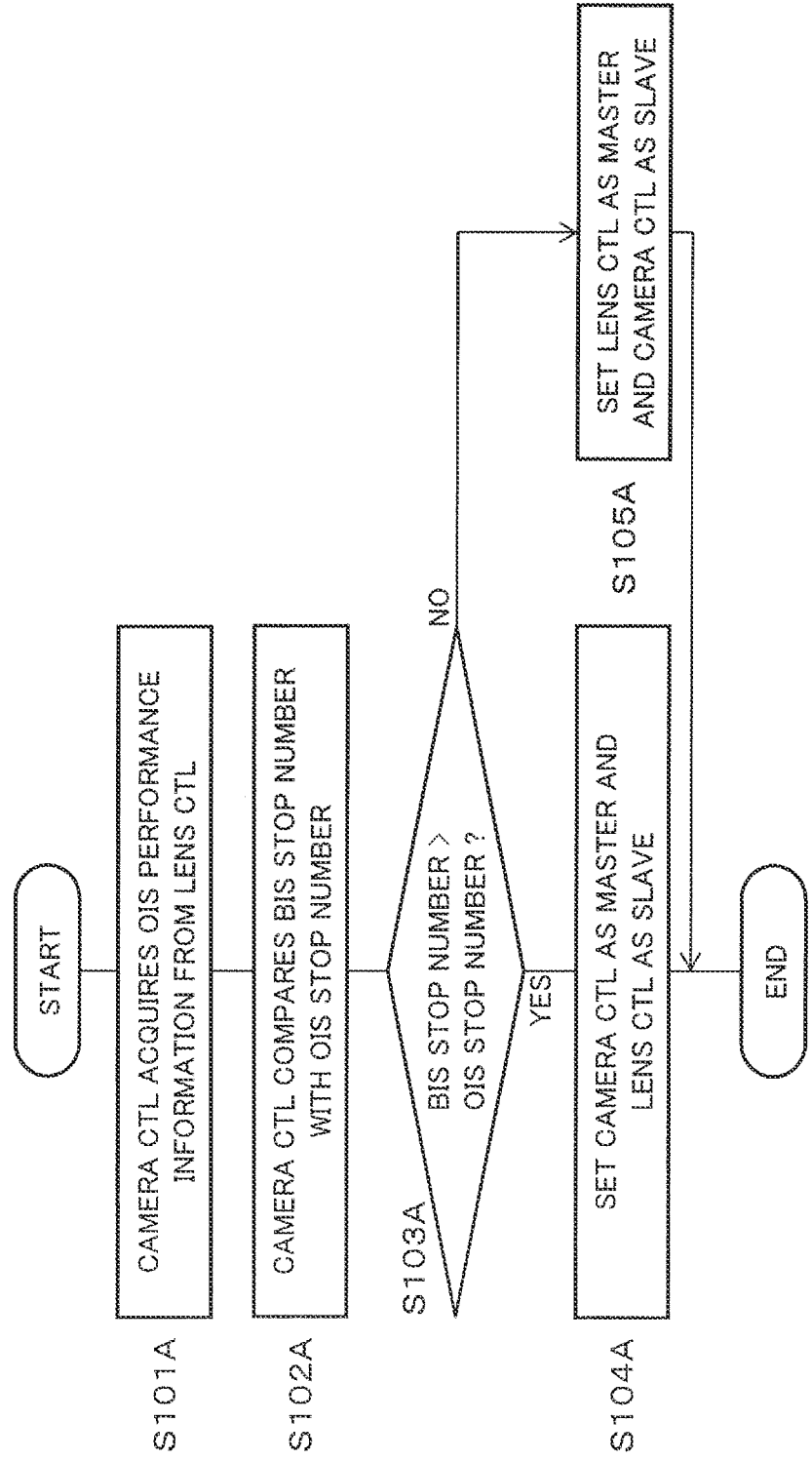

IMAGING APPARATUS AND IMAGE STABILIZATION SHARING BETWEEN INTERCHANGEABLE LENS AND CAMERA BODY

TECHNICAL FIELD

The present disclosure relates to an imaging apparatus having an image stabilizing function in both an interchangeable lens and a camera body.

BACKGROUND ART

An imaging apparatus provided with detection means (such as a gyro sensor) detecting a shake of the apparatus has hitherto existed. In the case of an interchangeable lens type camera, the detection means detecting a shake of the imaging apparatus is disposed in at least one of an interchangeable lens and a camera body (see, e.g., Patent Document 1). When the detection means is disposed in the interchangeable lens, a position of a shake correction lens included in the interchangeable lens is shifted based on a detection result of the detection means. When the detection means is disposed in the camera body, a position of an image sensor (image sensor) included in the camera body is shifted based on a detection result of the detection means.

CITATION LIST

Patent Document

Patent Document 1: JP 2009-251492 A

SUMMARY

The present disclosure provides an imaging apparatus capable of effectively utilizing an image stabilizing function of an interchangeable lens and a camera body.

An imaging apparatus of the present disclosure includes an interchangeable lens and a camera body. The interchangeable lens includes a correction lens, a lens driver, and a first controller. The correction lens corrects an image blur. The lens driver performs an image stabilization by moving the correction lens in a plane perpendicular to an optical axis. The first controller controls the image stabilization by the lens driver. The camera body includes an image sensor, a sensor driver, and a second controller. The image sensor captures an object image formed via the interchangeable lens to generate image data. The sensor driver performs an image stabilization by moving the image sensor in a plane perpendicular to the optical axis. The second controller controls the image stabilization by the sensor driver. The first or second controller selects one of the interchangeable lens and the camera body, in accordance with a level of correction capability to perform the image stabilization. Corresponding to the selected one, one driver of the lens driver and the sensor driver performs the image stabilization for the image blur within one correctable range. The other driver corresponding to non-selected one performs the image stabilization for a remaining portion of an image blur exceeding the one correctable range.

An interchangeable lens of the present disclosure is attached to a camera body. The interchangeable lens includes a correction lens and a lens driver. The correction lens corrects an image blur. The lens driver performs an image stabilization by moving the correction lens in a plane perpendicular to an optical axis. In a case where a correction capability of the interchangeable lens to perform the image stabilization is higher than a correction capability of the camera body, the lens driver performs the image stabilization within a first predetermined range. In a case where the correction capability of the interchangeable lens is lower than the correction capability of the camera body, the lens driver performs the image stabilization for a remaining portion of an image blur exceeding a second predetermined range.

A camera body of the present disclosure is to attach an interchangeable lens thereto. The camera body includes an image sensor and a sensor driver. The image sensor captures an object image formed via the interchangeable lens to generate image data. The sensor driver performs an image stabilization by moving the image sensor in a plane perpendicular to the optical axis. In a case where a correction capability of the interchangeable lens to perform the image stabilization is higher than a correction capability of the camera body, the sensor driver performs the image stabilization for a remaining portion of an image blur exceeding a first predetermined range. In a case where the correction capability of the interchangeable lens is lower than the correction capability of the camera body, the sensor driver performs the image stabilization within a second predetermined range.

The present disclosure can provide the imaging apparatus capable of effectively utilizing the image stabilizing function of the interchangeable lens and the camera body.

BRIEF DESCRIPTION OF DRAWINGS

FIG. 17 is a flowchart showing a master and slave setting operation of the digital camera.

DESCRIPTION OF EMBODIMENTS

Embodiments of the present disclosure will now be described with reference to the drawings as needed. It is noted that the detailed description may not include unnecessary portions of description in terms of conventional techniques and substantially the same constituent elements. This is for the purpose of simplification of description. The following description and the accompanying drawings are disclosed so that those skilled in the art can sufficiently understand the present disclosure, and it is not intended to limit the subject matter of claims. In the following description, a digital camera will be described as an example of an imaging apparatus.

First Embodiment

A digital camera of this embodiment has an image stabilizing function of reducing an influence of a shake of a camera on a captured image in each of an interchangeable lens and a camera body. Hereinafter, a function of shifting a correction lens in the interchangeable lens to correct a shake will be referred to as "OIS (Optical Image Stabilizer) function". A function of shifting an image sensor in the camera body to correct a shake will be referred to as "BIS (Body Image Stabilizer) function".

The digital camera of this embodiment preferentially uses one of the OIS function and the BIS function wherein the one image stabilizing function having a higher performance. The digital camera of this embodiment uses the other image stabilizing function when using only the prioritized image stabilizing function results in correction shortage. A configuration and an operation of the camera of this embodiment will hereinafter be described in detail.

1. Configuration

Figure 1:
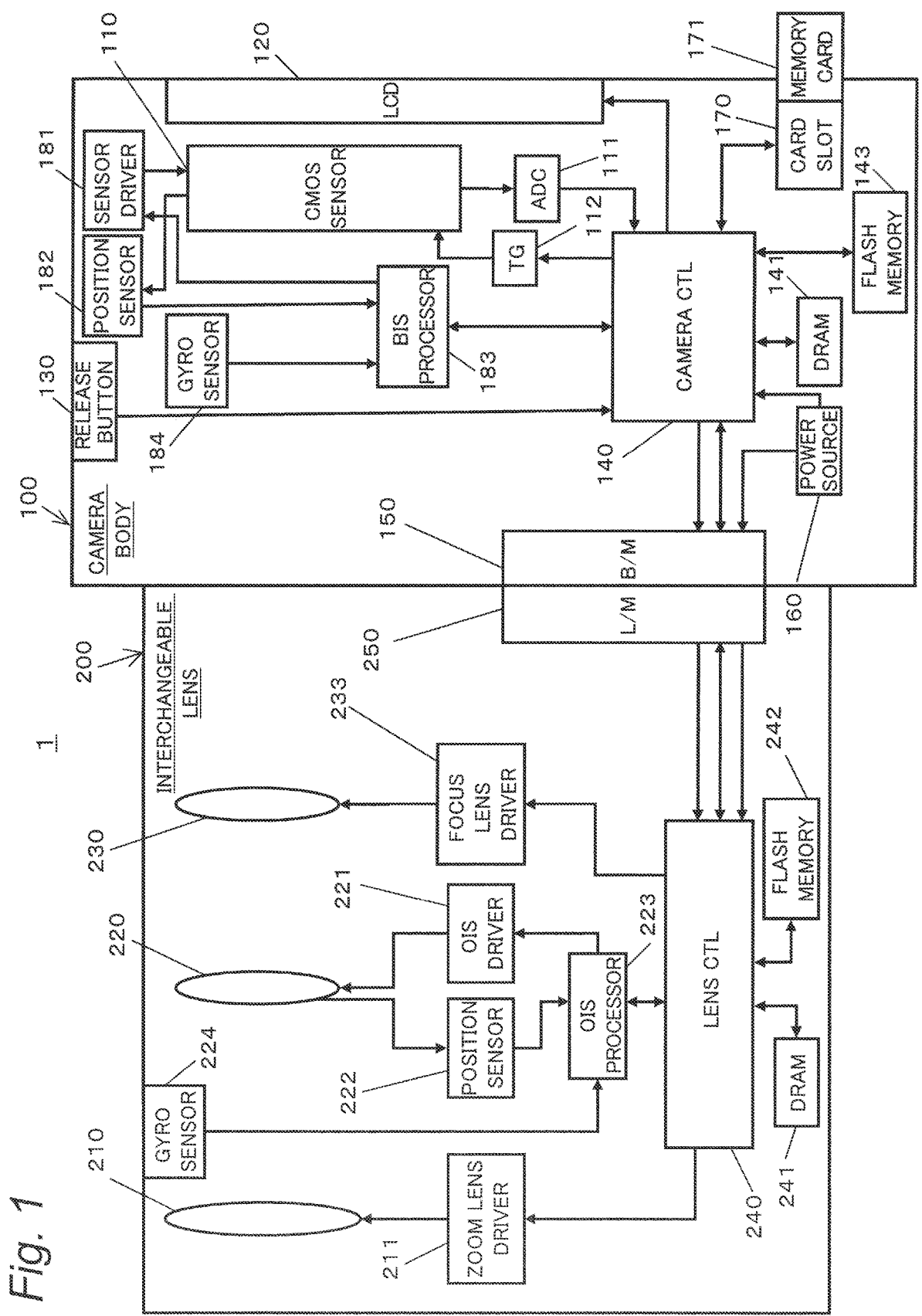
FIG. 1 is a block diagram showing a configuration of a digital camera according to a first embodiment.

FIG. 1 is a block diagram showing a configuration of a digital camera 1 according to a first embodiment of the present invention. The digital camera 1 is made up of a camera body 100 and an interchangeable lens 200 detachably attached thereto.

1-1. Camera Body

The camera body 100 includes a CMOS sensor 110, a liquid crystal monitor 120, a camera CTL (controller) 140, a body mount 150, a power source 160, and a card slot 170. The body mount 150 is an example of a second communication interface.

The camera CTL 140 controls constituent elements such as the CMOS sensor 110 in accordance with instructions from a release button 102, and controls an overall operation of the digital camera 1. The camera CTL 140 transmits a vertical synchronization signal to a timing generator 112. The camera CTL 140 concurrently generates an exposure synchronization signal. The camera CTL 140 periodically transmits the generated exposure synchronization signal via the body mount 150 and a lens mount 250 to a lens CTL 240. The camera CTL 140 uses a DRAM 141 as a work memory at the time of a control operation or an image processing operation.

The CMOS sensor 110 captures an object image incident through the interchangeable lens 200 to generate image data. The generated image data is digitized by an AD converter 111. The digitized image data is subjected to predetermined image processes by the camera CTL 140. For example, the predetermined image processes include a gamma correction process, a white balance correction process, a flaw correction process, a YC conversion processing, an electronic zoom process, and a JPEG compression process. The CMOS sensor 110 is an example of an image sensor.

The CMOS sensor 110 operates at a timing controlled by the timing generator 112. The operation of the CMOS sensor 110 includes a still image capturing operation, a through image capturing operation, and the like. The through image is mainly a moving image and is displayed on the liquid crystal monitor 120 for the user determining a composition for capturing a still image.

The liquid crystal monitor 120 displays an image indicated by display image data processed by the camera CTL 140. The liquid crystal monitor 120 can selectively display both a moving image and a still image.

The card slot 170 allows attachment of a memory card 171 thereto and controls the memory card 171 based on control from the camera CTL 140. The digital camera 1 can store image data into the memory card 171 and read image data from the memory card 171.

The power source 160 supplies electric power to various sections in the digital camera 1.

The body mount 150 is mechanically and electrically connectable to the lens mount 250 of the interchangeable lens 200. The camera body 100 and the interchangeable lens 200 can transmit and receive data via connectors disposed on the body mount 150 and the lens mount 250. The body mount 150 transmits the exposure synchronization signal received from the camera CTL 140, to the lens CTL 240 via the lens mount 250.

Other control signals received from the camera CTL 140 are also transmitted via the lens mount 250 to the lens CTL 240. The body mount 150 transmits a signal received from the lens CTL 240 via the lens mount 250, to the camera CTL 140. The body mount 150 supplies the electric power from the power source 160 via the lens mount 250 to the entire interchangeable lens 200.

The camera body 100 further includes, as a configuration implementing a BIS function (a function of correcting a camera shake by shifting the CMOS sensor 110), a gyro sensor 184 detecting a shake of the camera body 100 and a BIS processor 183 controlling a generation of a shake correction signal and an image stabilizing process based on a detection result of the gyro sensor 184. Furthermore, the camera body 100 includes a sensor driver 181 moving the CMOS sensor 110 and a position sensor 182 detecting the position of the CMOS sensor 110. The camera CTL 140 and the BIS processor 183 are an example of a second controller. The sensor driver 181 is an example of a sensor driver. The gyro sensor 184 is an example of a shake detector.

The sensor driver 181 can be implemented with a magnet and a flat coil, for example. The position sensor 182 is a sensor detecting the position of the CMOS sensor 110 in a plane perpendicular to an optical axis of an optical system. The position sensor 182 can be implemented with a magnet and a Hall element, for example. The BIS processor 183 controls the sensor driver 181 based on a signal from the gyro sensor 184 and a signal from the position sensor 182 to shift the CMOS sensor 110 in a plane perpendicular to the optical axis so as to cancel the shake of the camera body 100.

Although the imaging sensor included in the camera body 100 is a CMOS sensor in the above description, another image sensor such as a CCD may be used. The sensor driver 181 may be implemented by using other actuators such as a stepping motor and an ultrasonic motor. When a stepping motor is used as the actuator, open control can be provided, and accordingly, the need for the position sensor 182 can be eliminated.

1-2. Interchangeable Lens

The interchangeable lens 200 includes the optical system, the lens CTL 240, and the lens mount 250. The optical system includes a zoom lens 210, an OIS (Optical Image Stabilizer) lens 220, and a focus lens 230. The lens mount 250 is an example of a first communication interface.

The zoom lens 210 is a lens for changing a magnification of an object image formed by the optical system. The zoom lens 210 is made up of one or more lenses. The zoom lens driver 211 includes a zoom ring or the like that can be operated by the user and transmits an operation by the user to the zoom lens 210 to move the zoom lens 210 along an optical axis direction of the optical system.

The focus lens 230 is a lens for changing a focus state of the object image formed on the CMOS sensor 110 by the optical system. The focus lens 230 is made up of one or more lenses.

A focus lens driver 233 includes a motor and moves the focus lens 230 along the optical axis of the optical system based on control of the lens CTL 240. The focus lens driver 233 can be implemented with a DC motor, a stepping motor, a servo motor, an ultrasonic motor, or the like.

The OIS lens 220 is a lens for correcting a shake of the object image formed by the optical system of the interchangeable lens 200 in the OIS function (a function of correcting a camera shake by shifting the OIS lens 220). The OIS lens 220 moves in a direction canceling the shake of the digital camera 1 to reduce the shake of the object image on the CMOS sensor 110. The OIS lens 220 is made up of one or more lenses. An OIS processor 223 controls an OIS driver 221 based on a signal from a position sensor 222 and a signal from a gyro sensor 224. The OIS driver 221 shifts the OIS lens 220 in a plane perpendicular to the optical axis of the optical system under the control of the OIS processor 223. The lens CTL 240 and the OIS processor 223 are an example of a first controller. The OIS lens 220 is an example of a correction lens. The gyro sensor 224 is an example of a shake detector.

The OIS driver 221 can be implemented by a magnet and a flat coil, for example. The position sensor 222 is a sensor detecting the position of the OIS lens 220 in a plane perpendicular to the optical axis of the optical system. The position sensor 222 can be implemented by a magnet and a Hall element, for example. The OIS driver 221 may be implemented by using other actuators such as an ultrasonic motor. The OIS driver 221 is an example of the lens driver 221.

The gyro sensor 184 or 224 detects a shake (vibration) in a yawing direction and a pitching direction based on a change in angle per unit time, i.e., an angular velocity, of the digital camera 1. The gyro sensor 184 or 224 outputs an angular velocity signal indicative of an amount (angular velocity) of a detected shake to the BIS processor 183 or the OIS processor 223. The angular velocity signal output by the gyro sensor 184 or 224 may include a wide range of frequency components caused by camera shake, mechanical noise, and the like. In this embodiment, a gyro sensor is used as angular velocity detecting means; however, any other sensors capable of detecting a shake of the digital camera 1 can be used instead of the gyro sensor.

The camera CTL 140 and the lens CTL 240 are configured to implement predetermined functions in cooperation with software. The camera CTL 140 controls the operation of the camera body 100. The lens CTL 240 controls the operation of the interchangeable lens 200. The camera CTL 140 reads data and programs stored in a flash memory 143 to perform various arithmetic processes to implement the predetermined functions. The lens CTL 240 reads data and programs stored in a flash memory 242 to perform various calculations to implement the predetermined functions. The same applies to the OIS processor 223 or the BIS processor 183.

For example, the camera CTL 140 and the lens CTL 240 can be implemented with a semiconductor circuitry and the like. The functions of the camera CTL 140 and the lens CTL 240 may be implemented by combining hardware and software or may be implemented only by hardware. The camera CTL 140 and the lens CTL 240 may be made up of a semiconductor circuits such as CPU, MPU, GPU, ASIC, and FPGA, for example. The OIS processor 223 or the BIS processor 183 can be configured in the same way as the camera CTL 140 and the lens CTL 240.

1-3. BIS Processor

Figure 2:
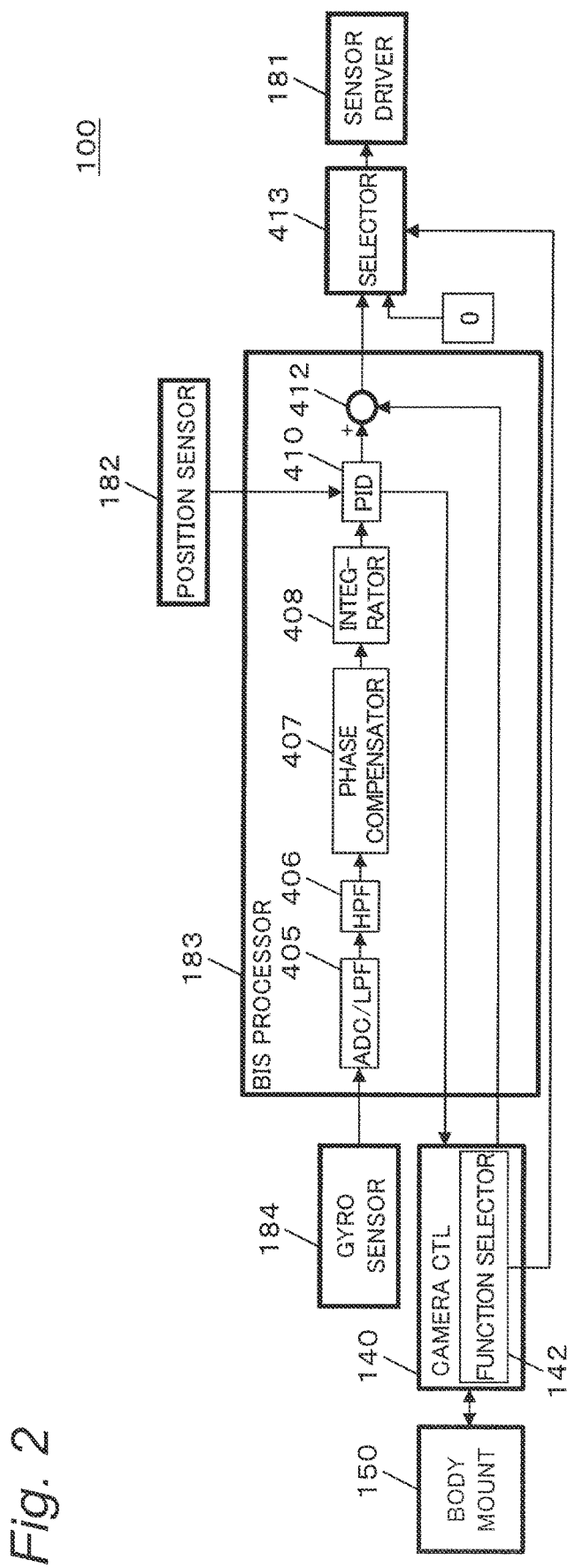
FIG. 2 is a block diagram showing a configuration of a BIS processor in the digital camera.

FIG. 2 is a block diagram showing a configuration of the BIS processor 183 in the camera body 100. The configuration of the BIS processor 183 in the camera body 100 will be described with reference to FIG. 2. The BIS processor 183 includes an ADC (analog to digital conversion)/LPF (low-pass filter) 405, an HPF (high-pass filter) 406, a phase compensator 407, an integrator 408, a PID controller 410, and a subtractor 412.

The ADC/LPF 405 converts the angular velocity signal from the gyro sensor 184, from an analog format to a digital format. Additionally, the ADC/LPF 405 blocks a high frequency component of the angular velocity signal converted into the digital format so as to remove noise and extract only the shake of the digital camera 1. The frequency of the camera shake due to a photographer is a low frequency of about 1 to 10 Hz, which is taken into consideration when the cutoff frequency of the LPF is set. When the noise causes no problem, the function of the LPF can be omitted.

The HPF 406 blocks a predetermined low frequency component included in a signal received from the ADC/LPF 405 so as to block a drift component. The phase compensator 407 compensates the signal received from the HPF 406 for a phase delay caused by the sensor driver 181 and lens-body communication (described later).

The integrator 408 integrates the signal indicative of the angular velocity of the shake (vibration) input from the phase compensator 407 to generate a signal indicative of the angle of the shake (vibration). Hereinafter, the angle of the shake is referred to as "shake amount", and the signal generated by the integrator 408 is referred to as "shake amount signal".

The shake amount signal from the integrator 408 is input to the PID controller 410. The PID controller 410 generates a shake correction signal for providing PID control of the sensor driver 181 based on the shake amount signal and a signal indicating the current position of the OIS lens 220 from the position sensor 182.

The subtractor 412 subtracts a signal input from the camera CTL 140 from the shake correction signal input from the PID controller 410, to output a shake correction signal after subtraction to the sensor driver 181. The shake correction signal after subtraction from the subtractor 412 will hereinafter be referred to as "BIS shake correction signal".

The subtractor 412 is connected to the sensor driver 181 via a selector 413. The selector 413 is used for selecting whether to input the BIS shake correction signal to the sensor driver 181. The selector 413 is controlled by the camera CTL 140 functioning as a function selector 142.

The function selector 142 sets the digital camera 1 so as to preferentially use the function having a higher image stabilization capability in the BIS function and the OIS function. The higher image stabilization capability is determined based on a smaller follow-up residual for the shake correction signal, such as better followability and responsiveness to high frequency components, or based on accuracy of camera-shake detecting angle information obtained from the gyro sensor 184, 224.

1-4. OIS Processor

Figure 3:
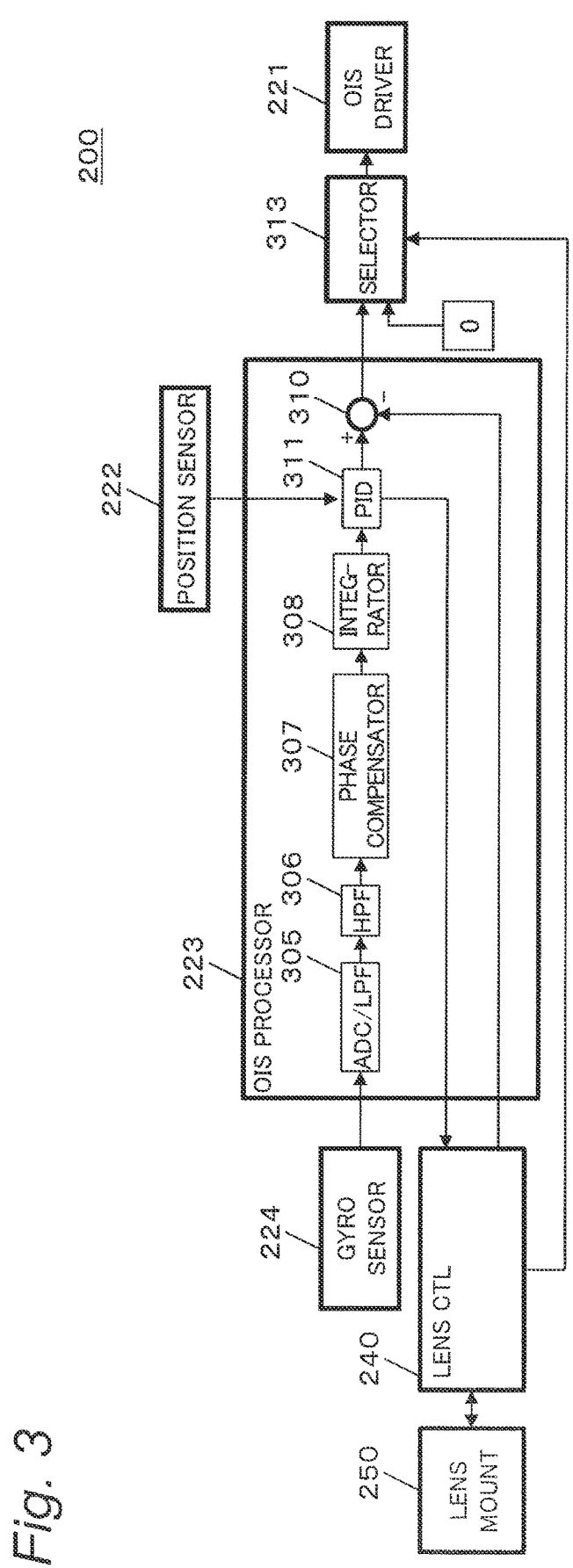
FIG. 3 is a block diagram showing a configuration of an OIS processor in the digital camera.

FIG. 3 is a block diagram showing a configuration of the OIS processor 223 in the interchangeable lens 200. The configuration of the OIS processor 223 in the interchangeable lens 200 will be described with reference to FIG. 3. The OIS processor 223 includes an ADC (analog to digital converter)/LPF (low-pass filter) 305, an HPF (high-pass filter) 306, a phase compensator 307, an integrator 308, a PID controller 311, and a subtractor 310.

The basic functions of the ADC/LPF 305, the HPF 306, the phase compensator 307, the integrator 308, the PID controller 311, and the subtractor 310 are the same as the functions of the corresponding elements in the BIS processor 183. The shake correction signal after subtraction from the subtractor 310 will hereinafter be referred to as "OIS shake correction signal".

As with the BIS processor 183, the subtractor 310 of the OIS processor 223 is connected to the OIS driver 221 via a selector 313. The selector 313 is used for selecting whether to input the OIS shake correction signal to the OIS driver 221. The selector 313 is controlled by the function selector 142 of the camera body 100 via the lens CTL 240. Details of the operation will be described later.

2. Operation

The operation of the digital camera 1 configured as described above will be described.

Figure 4:
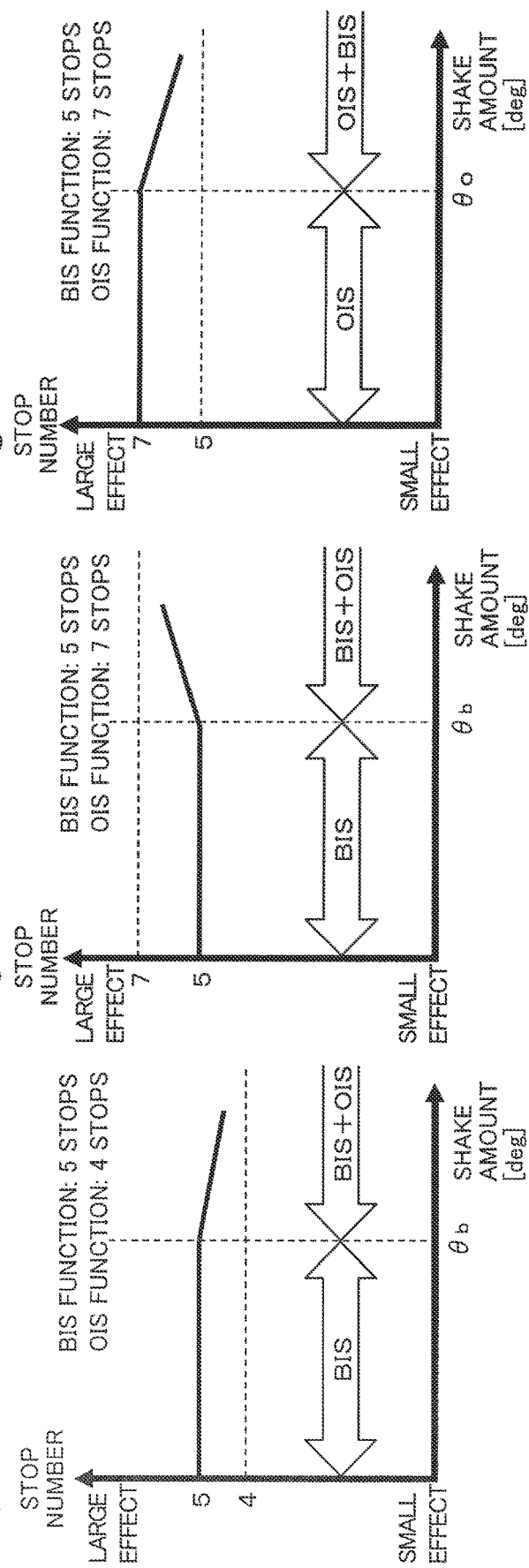
FIGS. 4A to 4C are diagrams for explaining an overview of an operation of the digital camera.

FIGS. 4A to 4C are diagrams for explaining an overview of the operation of the digital camera 1. The digital camera 1 of this embodiment compares the correction capability of the BIS function in the digital camera with the correction capability of the OIS function, to perform mode setting and the like so that a higher correction capability is preferentially used. The digital camera 1 performs an image stabilization by using one function having a higher priority in the BIS function and the OIS function. When the shake amount exceeds a range of correction that can be achieved by the function having the higher priority, the digital camera 1 performs the image stabilization by using the other function.

FIG. 4A is a graph illustrating an effect of an image stabilizing operation when the camera body 100 has a higher correction capability than the interchangeable lens 200 in the digital camera 1 of this embodiment. FIG. 4B shows an example of the effect assumed when the correction capability of the interchangeable lens is higher than the camera body. FIG. 4C illustrates the effect of the image stabilizing operation in this embodiment in the same case as FIG. 4B. In this embodiment, the correction capability is the capability of the camera body 100 and the interchangeable lens 200 to perform the image stabilization and is represented by "stop number (i.e., correction effect stop number)" in the CIPA standard.

FIG. 4A illustrates the case that the camera body 100 has the BIS function of five stops and the interchangeable lens 200 has the OIS function of four stops. In such a case, the digital camera 1 of this embodiment performs the image stabilization by using only the BIS function for the shake amount within a range equal to or less than a maximum value θb of the shake amount correctable with the BIS function. On the other hand, when the shake amount exceeds the maximum value θb of the image stabilization with the BIS function, the digital camera 1 performs the image stabilization by using the OIS function in addition to the BIS function. By preferentially using the BIS function having a larger stop number in this way, the digital camera 1 of this embodiment can effectively utilize the image stabilizing function. Particularly, when the shake amount is as small as the maximum value θb, the image stabilization effect can be obtained for five stops, which is the largest in the image stabilizing function of the digital camera 1 of this example.

FIG. 4B illustrates the case that an interchangeable lens having the OIS function of seven stops, which is larger than the stop number of the BIS function, is connected to the camera body in a digital camera preferentially using the BIS function as in the example of FIG. 4A. In this case, even if the shake amount is small (θb or less), it is difficult to effectively utilize the image stabilizing function of the digital camera 1. Specifically, in the digital camera shown in FIG. 4B, the effect obtained for the small shake amount is five stops even though the interchangeable lens has the image stabilization capability of seven stops.

To address this, in the digital camera 1 of this embodiment as shown in FIG. 4C, when the interchangeable lens 200 having the OIS function with a stop number greater than the BIS function is connected to the camera body 100, the image stabilization is performed by using only the OIS function within a range equal to or less than a maximum value θo of the shake amount correctable with the OIS function. On the other hand, when the shake amount exceeds the maximum value θo of the image stabilization with the OIS function, the digital camera 1 performs the image stabilization by using the BIS function in addition to the OIS function. As a result, when the shake amount is small (θo or less), the largest effect of seven steps can be obtained in the image stabilizing function of the digital camera 1. Even if the shake amount exceeds the maximum value θo of the image stabilization with the OIS function, for example, an effect of five steps or more can be obtained.

As described above, the digital camera 1 of this embodiment can effectively utilize the image stabilizing function of the digital camera 1 by preferentially using the image stabilizing function having a large stop number. Details of the operation of the digital camera 1 of this embodiment will hereinafter be described.

2-1. Priority Mode Setting Operation

In this embodiment, the digital camera 1 performs the following operation for setting the priority mode of the image stabilizing function described above, when the camera body 100 and the interchangeable lens 200 are connected, or at the time of power-on, for example.

Figure 5:
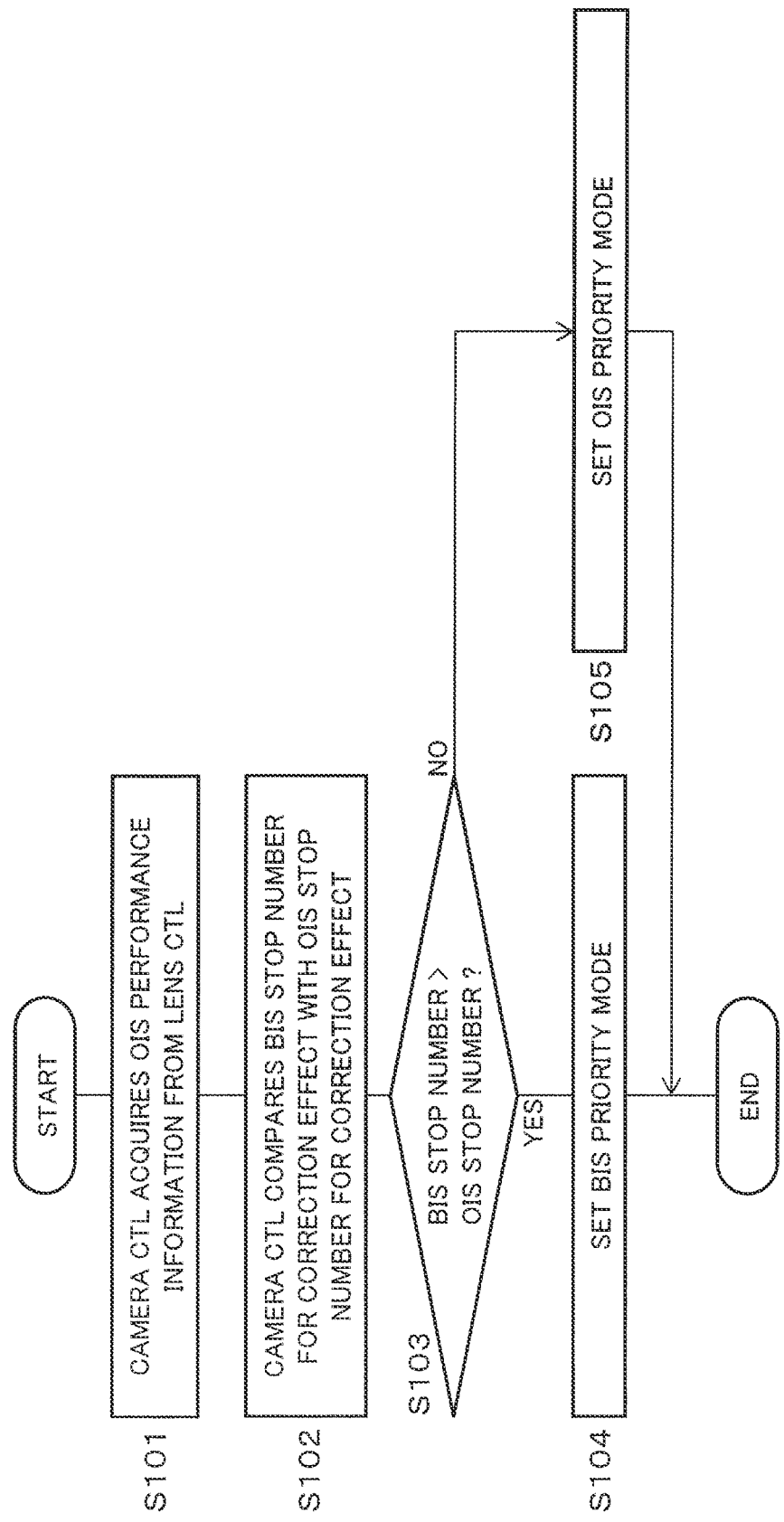
FIG. 5 is a flowchart showing a setting operation of a priority mode of an image stabilizing function.

FIG. 5 is a flowchart showing a setting operation of the priority mode of the image stabilizing function. The processes shown in the flowchart of FIG. 5 are executed by the camera CTL 140 functioning as the function selector 142.

At first, the camera CTL 140 serving as the function selector 142 acquires OIS performance information from the lens CTL 240 (S101). The OIS performance information includes information on the stop number of the OIS function, and information indicative of a correctable range e.g.

the maximum value θo of the shake amount correctable with the OIS function. The OIS performance information is stored in the flash memory 242 of the interchangeable lens 200, for example. The function selector 142 requests the OIS performance information from the lens CTL 240. The lens CTL 240 acquires the OIS performance information from the flash memory 242 and transmits the OIS performance information to the function selector 142.

The function selector 142 compares the stop number for correction effect of the BIS function with the stop number for correction effect of the OIS function (S102). The function selector 142 acquires BIS performance information. The BIS performance information includes information on the stop number for correction effect of the BIS function, and information indicative of a correctable range e.g. the maximum value θb of the shake amount correctable with the BIS function. The BIS performance information is stored in the flash memory 143 of the camera body 100, for example. The function selector 142 acquires the BIS performance information from the flash memory 143 and compares the stop number for correction effect of the BIS function with the stop number for correction effect of the OIS function.

Figure 6:
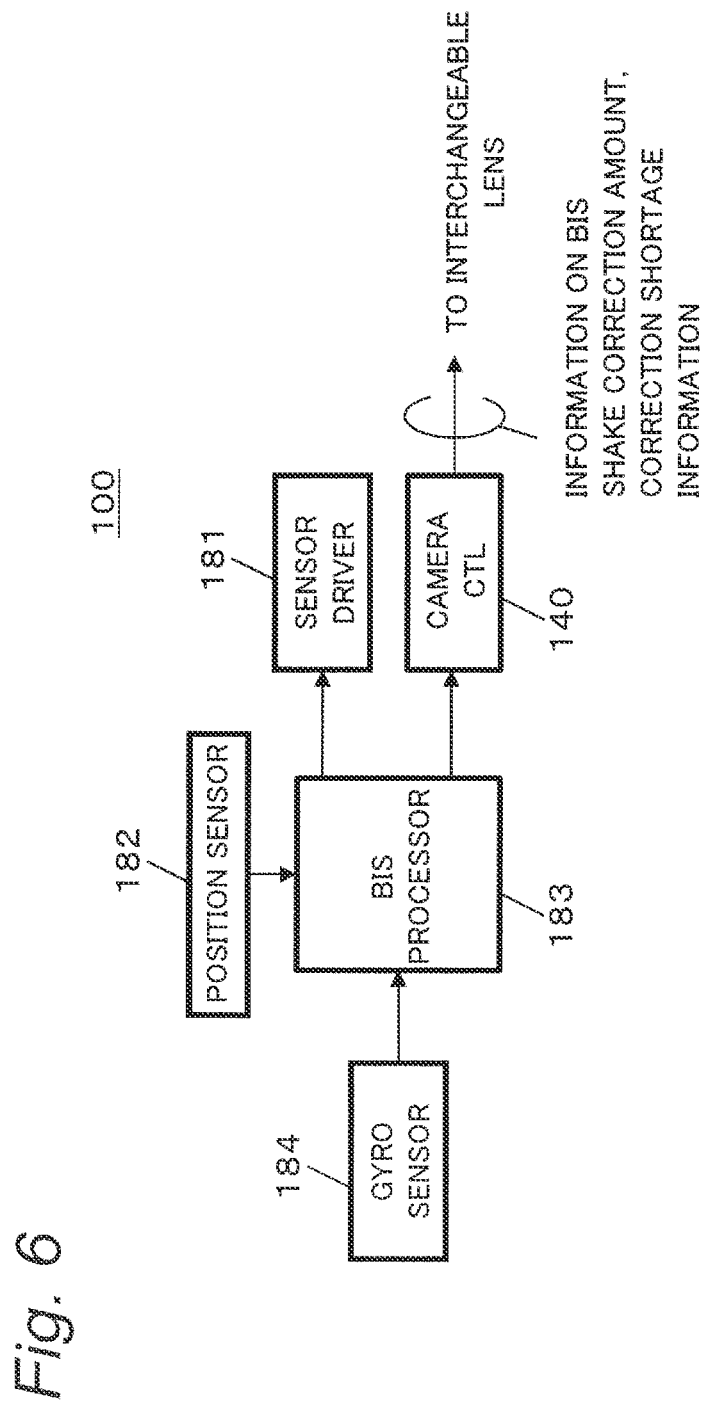
FIG. 6 is a diagram for explaining a camera body in a BIS priority mode.
Figure 7:
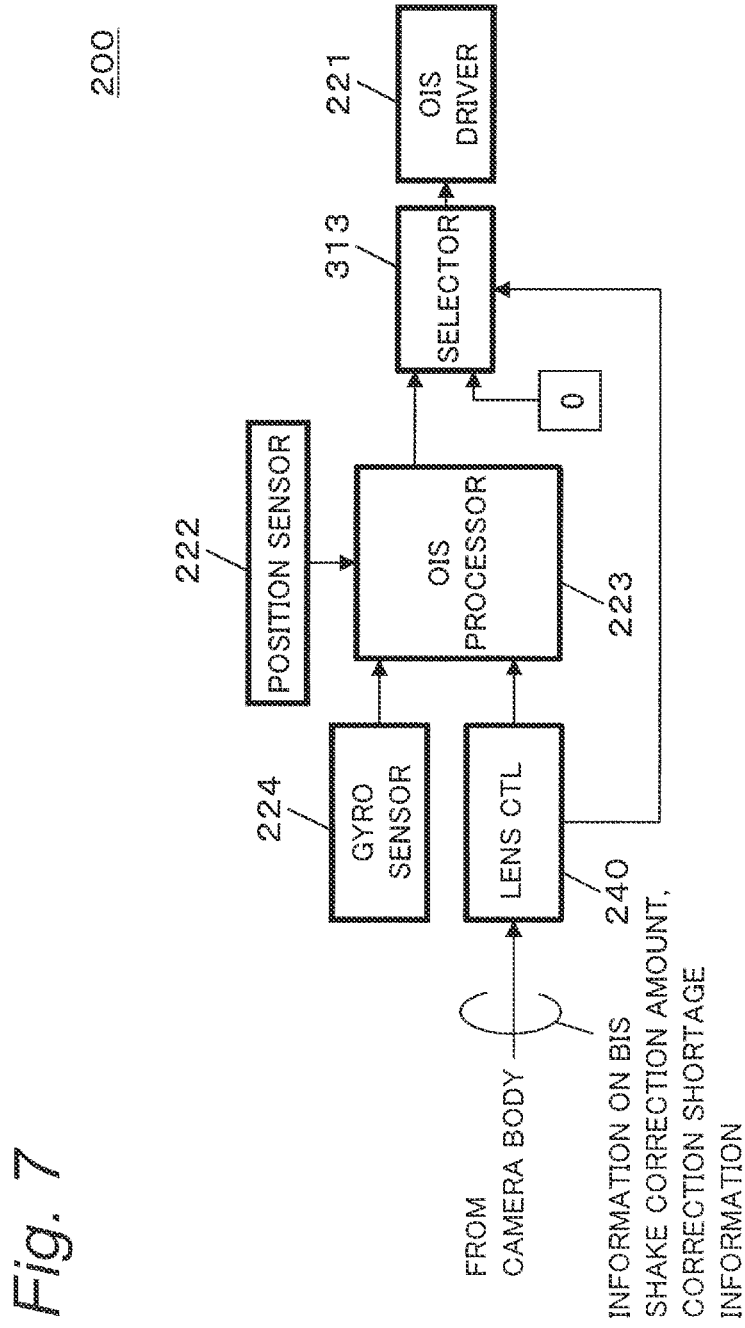
FIG. 7 is a diagram for explaining an interchangeable lens in the BIS priority mode.

When it is determined that the stop number of the BIS function is greater than the stop number of the OIS function (YES at S103), the function selector 142 sets the camera body 100 and the interchangeable lens 200 to a "BIS priority mode" in which the BIS function is preferentially used (S104). FIG. 6 is a diagram for explaining the camera body 100 in the BIS priority mode. FIG. 7 is a diagram for explaining the interchangeable lens 200 in the BIS priority mode. Details of the BIS priority mode will be described later (see FIGS. 8A to 8C and 9).

Figure 10:
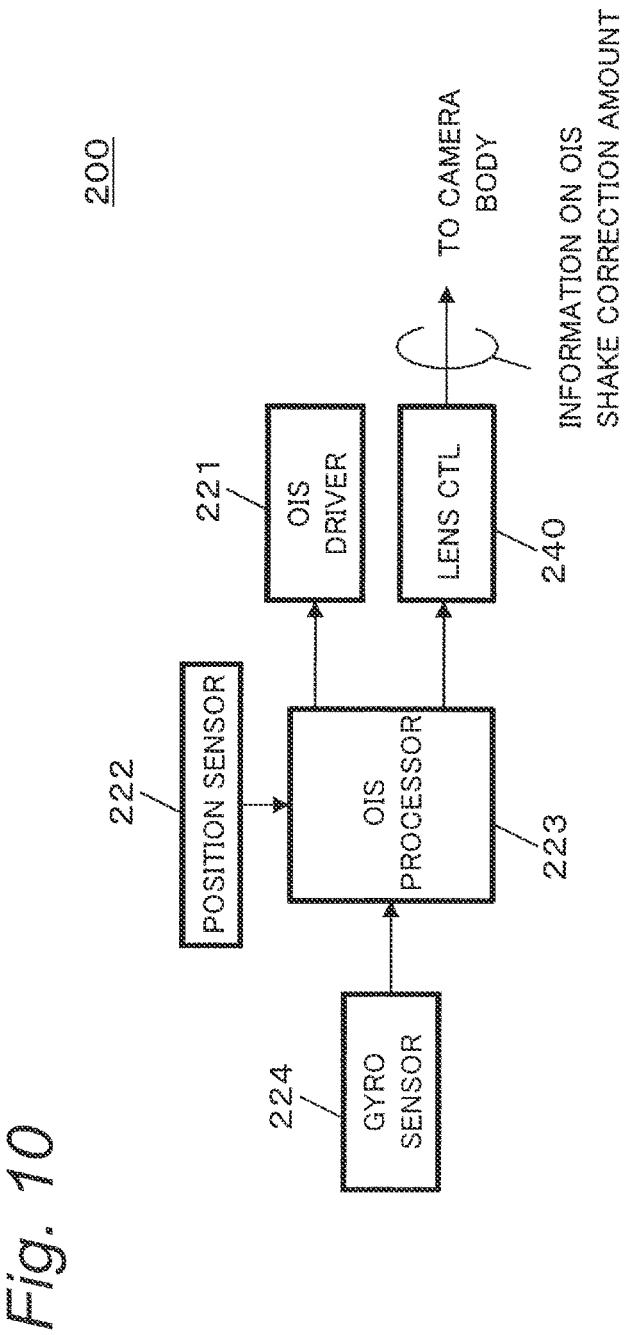
FIG. 10 is a diagram for explaining the interchangeable lens in an OIS priority mode.
Figure 11:
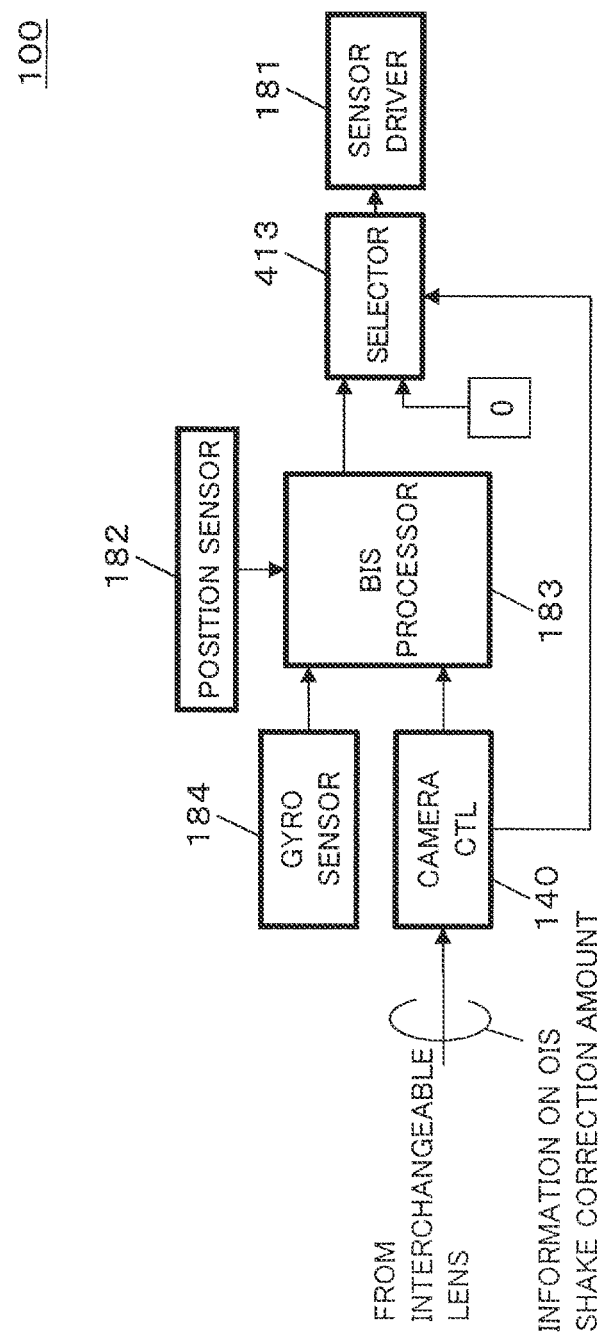
FIG. 11 is a diagram for explaining the camera body in the OIS priority mode.

On the other hand, when it is determined that the stop number of the BIS function is equal to or less than the stop number of the OIS (NO at S103), the function selector 142 sets the camera body 100 and the interchangeable lens 200 to an "OIS priority mode" in which the OIS function is preferentially used (S105). FIG. 10 is a diagram for explaining the interchangeable lens 200 in the OIS priority mode. FIG. 11 is a diagram for explaining the camera body 100 in the OIS priority mode. Details of the OIS priority mode will be described later (see FIGS. 12A to 12C and 13).

According to the setting operation of the priority mode described above, the BIS priority mode or the OIS priority mode is set as a selection result of selecting one of the BIS function and the OIS function to be preferentially used depending on the level of the correction capability. The operations of the digital camera 1 in the BIS priority mode and the OIS priority mode will hereinafter be described.

2-2. BIS Priority Mode

The operation of the digital camera 1 in the BIS priority mode will be described with reference to FIGS. 6 to 9.

FIGS. 8A to 8C are diagrams for explaining the image stabilizing operation in the BIS priority mode. FIG. 8A is a diagram illustrating a temporal change of the shake amount detected by the digital camera 1. FIG. 8B is a timing chart illustrating a control signal of the BIS selector 413 in the BIS priority mode. FIG. 8C is a timing chart illustrating a control signal of the OIS selector 313 in the BIS priority mode corresponding to the example of FIG. 8A.

FIG. 8A shows an example in which a shake amount exceeding a correctable range Rb of the BIS function is detected. The correctable range Rb is set in accordance with the θb described above, for example. In the BIS priority mode, the control signal of the BIS selector 413 is set to "1" as shown in FIG. 8B, for example. As a result, a BIS shake correction signal is always input from the BIS processor 183 to the sensor driver 181, as shown in FIG. 6. On the other hand, the control signal of the OIS selector 313 changes depending on the shake amount (FIG. 8A) as shown in FIG. 8C, for example.

Figure 9:
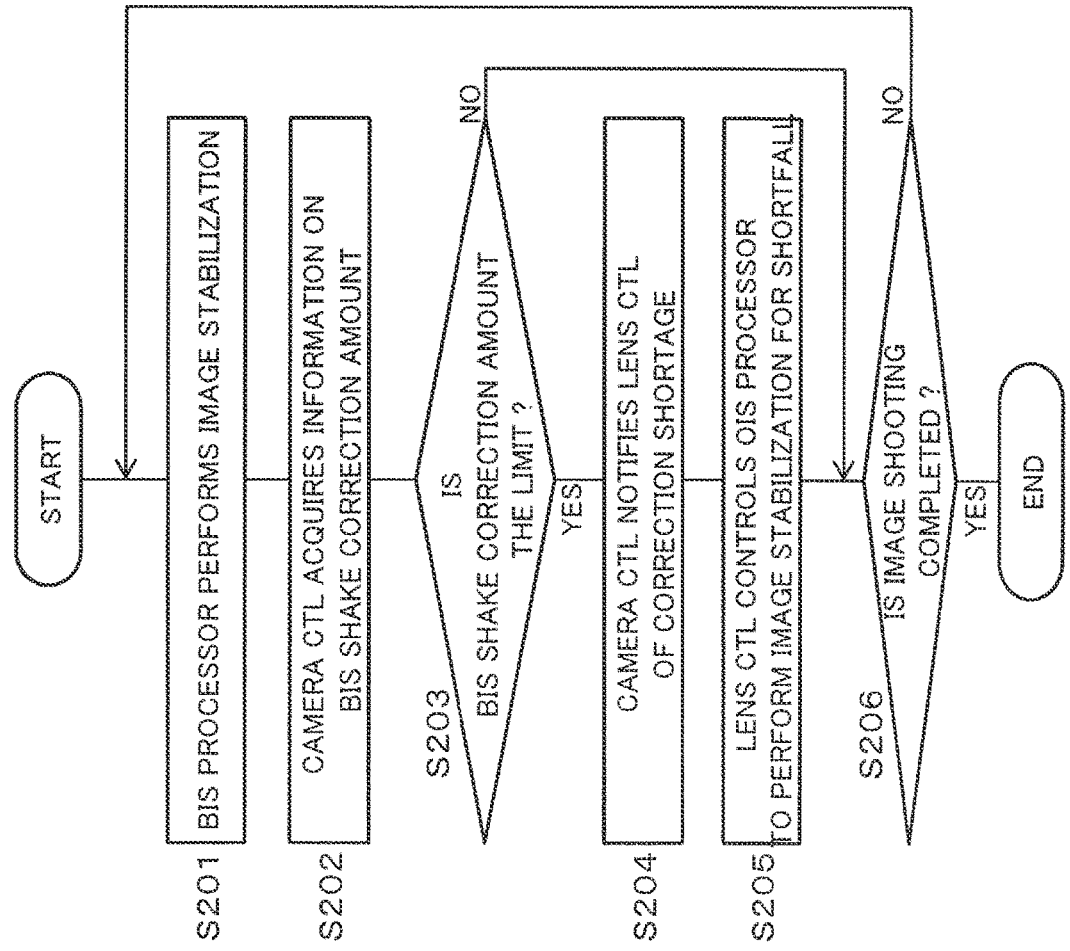
FIG. 9 is a flowchart showing the image stabilizing operation in the BIS priority mode.

FIG. 9 is a flowchart showing the image stabilizing operation of the digital camera 1 in the BIS priority mode. After the BIS priority mode is set, the digital camera 1 performs the following operation, for example, upon detecting that the user presses the release button.

At first, the BIS processor 183 executes calculation processing for the image stabilization with the BIS function (S201). The BIS processor 183 of FIG. 6 calculates a BIS shake correction amount based on the angular velocity signal from the gyro sensor 184 and the signal indicative of the position of the CMOS sensor 110 from the position sensor 182. The sensor driver 181 drives the CMOS sensor 110 by the calculated BIS shake correction amount to perform the shake correction with the BIS function.

The camera CTL 140 then acquires BIS shake correction information from the BIS processor 183 (S202). For example, the BIS shake correction information indicates a BIS shake correction amount. At this step, the camera CTL 140 may transmit the BIS shake correction information to the interchangeable lens 200 (see FIG. 6). In the interchangeable lens 200, the OIS processor 223 may calculate an OIS shake correction amount under the control of the lens CTL 240 based on the BIS image stabilization (see FIG. 7). However, when the control signal of the OIS selector 313 is "0", the OIS shake correction signal is not input to the OIS driver 221 and the shake correction with the OIS function is not performed.

The camera CTL 140 then determines whether the current shake amount exceeds the BIS correctable range Rb based on the acquired BIS shake correction information (S203). For example, the camera CTL 140 in turn acquires the BIS shake correction information and determines the shake amount changing over time as shown in FIG. 8A. The camera CTL 140 refers to the correctable range in the BIS performance information stored in the flash memory 143 of the camera body 100, for example.

Figure 8:
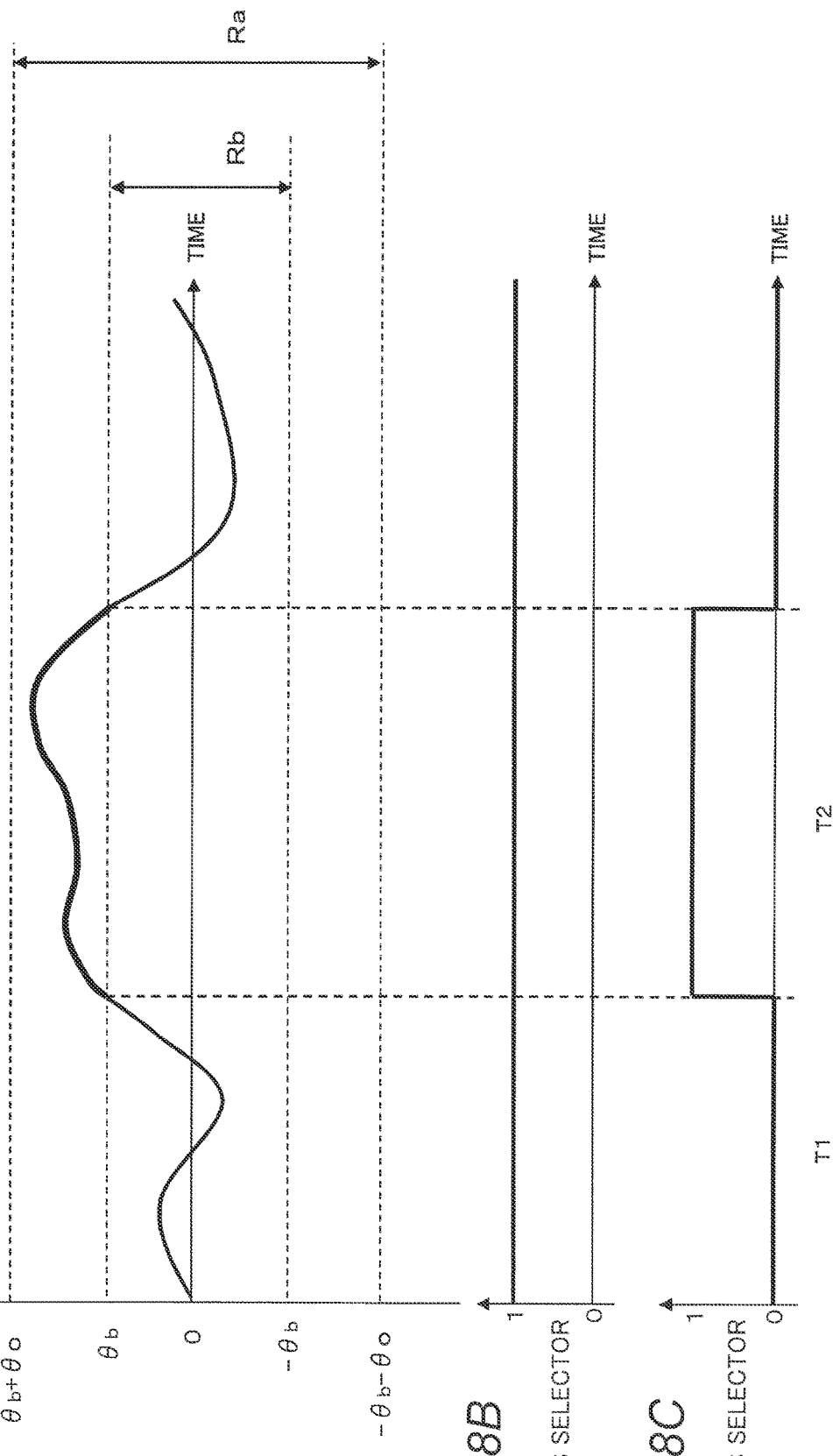
FIGS. 8A to 8C are diagrams for explaining an image stabilizing operation in the BIS priority mode.

When the camera CTL 140 determines that the shake amount does not exceed the BIS correctable range Rb (NO at S203), and the image shooting with the digital camera 1 is not finished (NO at S206), the BIS processor 183 performs the shake correction again (S201). As a result, for example, in a period T1 in FIG. 8, the shake correction with the BIS function is continuously applied (FIG. 8B). In this case, as shown in FIG. 8C, the OIS function is not applied.

On the other hand, when it is determined that the shake amount exceeds the BIS correctable range Rb (YES at S203), the camera CTL 140 transmits correction shortage information to the lens CTL 240 (S204). The correction shortage information is information indicating that the shake correction is insufficient when only the BIS function (or the OIS function) is used. In this case, the BIS shake correction information is also transmitted to the lens CTL 240.

The lens CTL 240 receives the correction shortage information on the camera shake, and causes the OIS processor 223 to perform the image stabilization for the shortfall (S205). The lens CTL 240 controls the control signal of the OIS selector 313 to "1" as indicated by a period T2 of FIG. 8C, for example. The lens CTL 240 sets the selector 313 to input the OIS shake correction signal to the OIS driver 221 only when the correction shortage information on the camera shake is received, thereby causing the OIS processor 223 to perform the image stabilization for the shortfall.

At step S205, the BIS shake correction amount is input from the lens CTL 240 to the OIS processor 223. The OIS processor 223 calculates an OIS shake correction amount based on the angular velocity signal from the gyro sensor 224 and the signal from the position sensor 222 so that the input BIS shake correction amount is subtracted. In this case, the OIS shake correction signal of the calculation result is input in accordance with the control signal of the OIS selector 313 (FIG. 8C) via the selector 313 to the OIS driver 221, and the image stabilization with the OIS function is performed.

The digital camera 1 repeatedly executes the processes of steps S201 to S205 until the image shooting is finished (YES at S206).

As described above, the digital camera 1 in the BIS priority mode performs the image stabilization by preferentially using the BIS function having higher performance than the OIS function (S201), and uses the OIS function for correcting only the portion of the shake amount exceeding the correctable range Rb of the BIS function (S204). As a result, the image stabilizing function of the digital camera 1 can effectively be utilized.

2-3. OIS Priority Mode

In the OIS priority mode, the operation similar to the above BIS priority mode is performed with the BIS function and the OIS function replaced with each other. The operation of the digital camera 1 in the OIS priority mode will be described with reference to FIGS. 10 to 13.

Figures 12A, 12B, 12C:
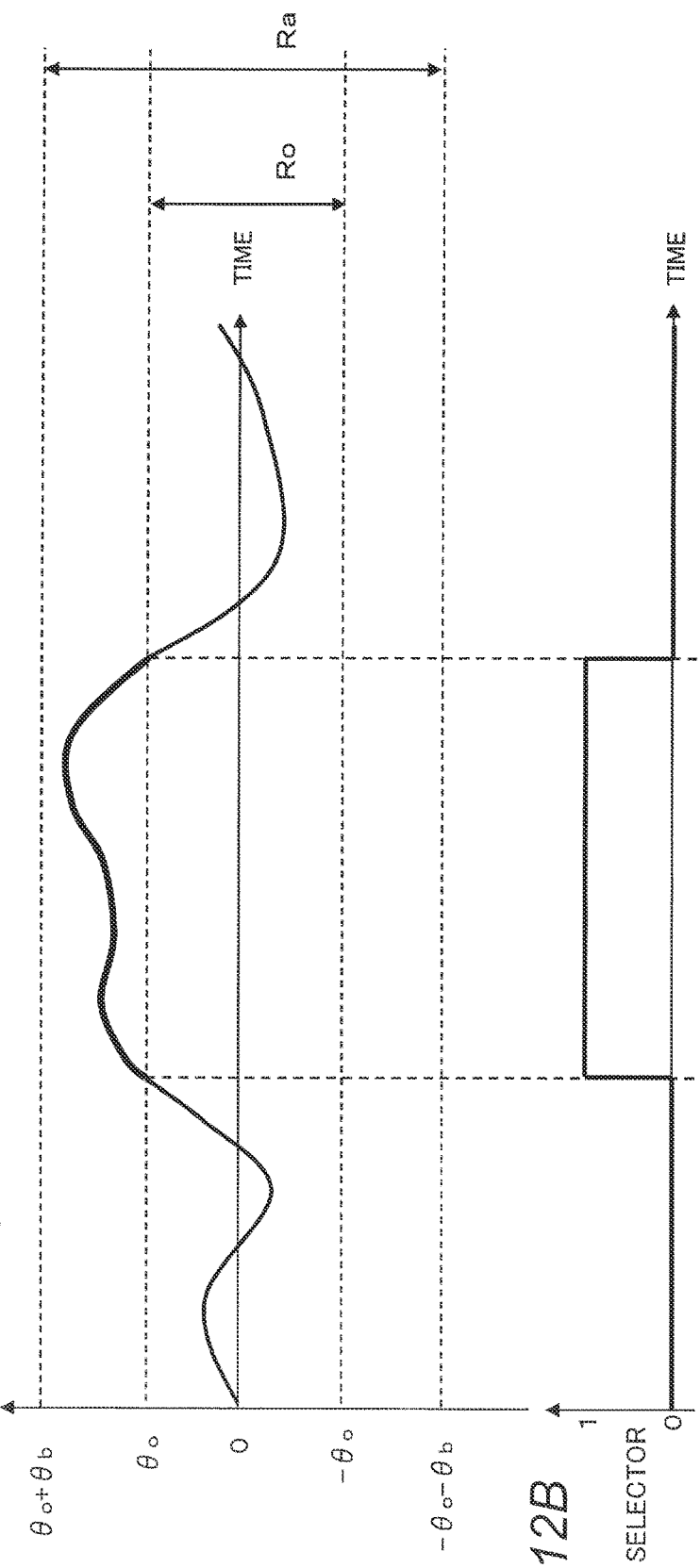
FIGS. 12A to 12C are diagrams for explaining the image stabilizing operation in the OIS priority mode.

FIGS. 12A to 12C are diagrams for explaining the image stabilizing operation in the OIS priority mode. FIG. 12A illustrates a temporal change of the shake amount as in FIG. 8A. FIG. 12B illustrates the control signal of the BIS selector 413 in the OIS priority mode. FIG. 12C illustrates the control signal of the OIS selector 313 in the OIS priority mode corresponding to the example of FIG. 8A.

FIG. 12A illustrates a correctable range Ro of the OIS function (corresponding to θo described above) instead of the correctable range Rb of the BIS function. In the OIS priority mode, the BIS selector 313 is controlled in accordance with the shake amount (FIG. 12A) as shown in FIG. 8B, for example (FIG. 12B). On the other hand, the OIS selector 413 always inputs the OIS shake correction signal to the OIS driver 221 in accordance with the control signal as shown in FIG. 8C, for example (FIG. 12C).

Figure 13:
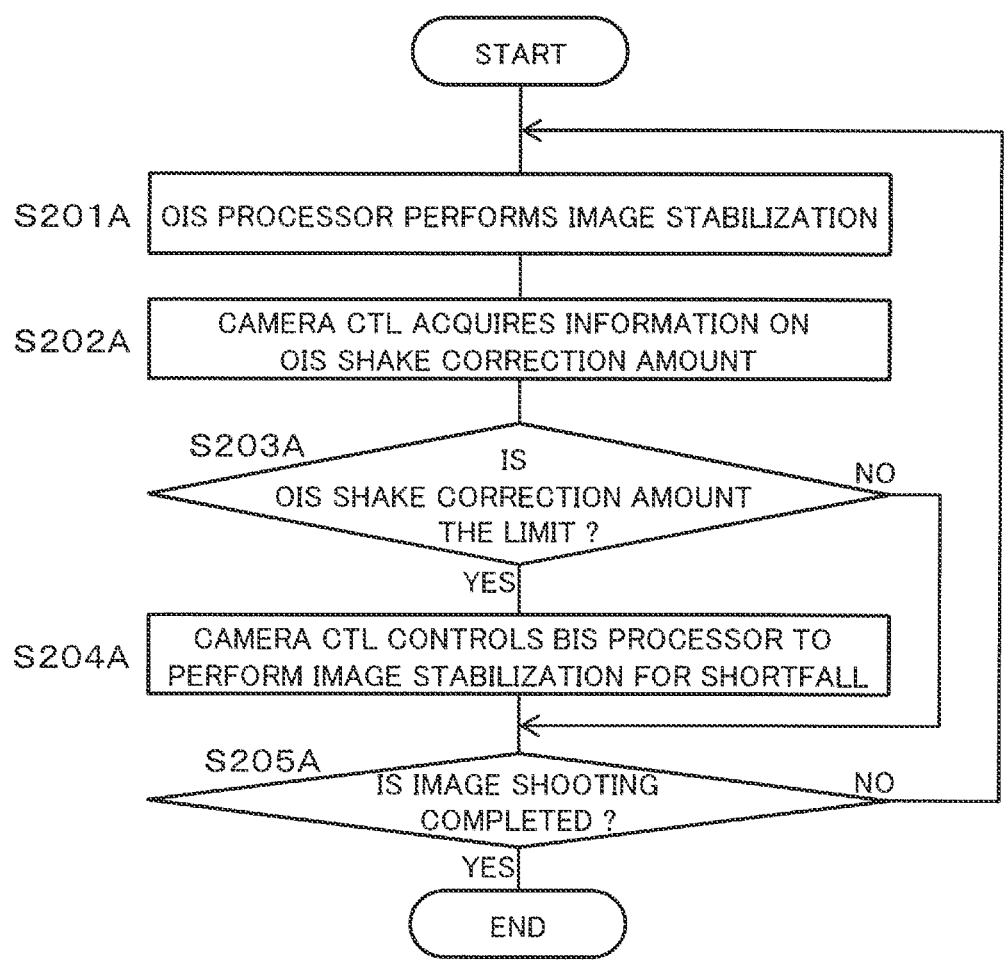
FIG. 13 is a flowchart showing the image stabilizing operation in the OIS priority mode.

FIG. 13 is a flowchart showing the image stabilizing operation in the OIS priority mode. After the OIS priority mode is set, the digital camera 1 in the OIS priority mode performs the following operation in the same way as the flowchart of FIG. 9.

In the OIS priority mode, at first, the OIS processor 223 executes the same calculation processing for the image stabilization as the process (S201 of FIG. 9) executed by the BIS processor 183 in the BIS priority mode (S201A).

As the function selector 142 is disposed in the camera CTL 140 in this embodiment, the camera CTL 140 acquires information indicative of the OIS shake correction amount from the OIS processor 223 via the lens CTL 240 (S202A).

The camera CTL 140 then determines whether the shake amount exceeds the correctable range Ro of the OIS function based on the acquired information as in S203 of FIG. 9 (S203A). At this step, the camera CTL 140 refers to, for example, the information acquired in the setting operation of the priority mode (step S101 of FIG. 5).

When it is determined that the shake amount does not exceed the OIS correctable range Ro (NO at S203A), the camera CTL 140 continues the image stabilization using only the OIS function as indicated by a period T3 of FIG. 12, for example (S201A). On the other hand, when it is determined that the shake amount exceeds the OIS correctable range Ro (YES at S203A), the camera CTL 140 causes the BIS processor to perform the image stabilization for the shortfall (S204A).

The digital camera 1 repeatedly executes the processes of steps S201A to S204A until the image shooting is finished (YES at S205A).

According to the operation in the OIS priority mode described above, when the correction capability of the OIS function is higher than the BIS function, the OIS function is prioritized so that the image stabilizing function of the digital camera 1 can effectively be utilized as in the BIS priority mode.

3. Summary

As described above, the digital camera 1 of this embodiment includes the interchangeable lens 200 and the camera body 100. The interchangeable lens 200 includes the OIS lens 220, the OIS driver 221, the OIS processor 223, and the lens CTL 240. The OIS lens 220 corrects a camera shake. The OIS driver 221 performs the image stabilization by moving the OIS lens 220 in a plane perpendicular to the optical axis. The OIS processor 223 controls the image stabilization of the OIS driver 221. The camera body 100 includes the CMOS sensor 110, the sensor driver 181, the BIS processor 183, and the camera CTL 140. The CMOS sensor 110 captures an object image formed via the interchangeable lens 200 to generate image data. The sensor driver 181 performs an image stabilization by moving the CMOS sensor 110 in a plane perpendicular to the optical axis. The BIS processor 183 controls the image stabilization of the sensor driver 181. The camera CTL 140 or the lens CTL 240 selects one of the interchangeable lens 200 and the camera body 100 depending on a level of image stabilization capability. In the sensor driver 181 and the OIS driver 221, the driver of the selected one performs an image stabilization for a camera shake within the correctable range Rb or Ro. The driver of the other non-selected one performs an image stabilization for a remaining portion of an image blur exceeding the correctable range Rb or Ro. The camera shake is an example of the image blur.

Therefore, the digital camera 1 can effectively utilize the image stabilizing function of the interchangeable lens 200 and the camera body 100.

In the BIS processor 183 and the OIS processor 223, the processor of the selected one calculates a shake correction amount for the camera shake within the correctable range Rb or Ro, and the processor of the other one calculates a shake correction amount corresponding to a remaining portion of the camera shake exceeding the correctable range Rb or Ro.

Therefore, the digital camera 1 can calculate the shake correction amount in each of the processors.

The CTL connected to the processor, which is one of the camera CTL 140 and the lens CTL 240 having performed the selection, detects whether the camera shake exceeds the correctable range Rb or Ro.

Therefore, the digital camera 1 can determine whether to perform the image stabilization using the function that is not preferentially used.

The digital camera 1 includes the gyro sensor 184 detecting a shake of the camera body 100 and the gyro sensor 224 detecting a shake of the interchangeable lens 200. The BIS processor 183 controls the shake correction based on the detection result of the gyro sensor 184. The OIS processor 223 controls the shake correction based on the detection result of the gyro sensor 224.

Therefore, the digital camera 1 can detect the shake amount and control the shake correction in each of the camera body 100 and the interchangeable lens 200.

The interchangeable lens 200 is attached to the camera body 100. The interchangeable lens 200 includes the OIS lens 220 and the OIS driver 221. The OIS lens 220 corrects the camera shake. The OIS driver 221 performs the image stabilization by moving the OIS lens 220 in a plane perpendicular to the optical axis. When the correction capability of the interchangeable lens 200 performing the image stabilization is higher than the correction capability of the camera body 100, the OIS driver 221 performs the image stabilization within the magnitude Ro of the shake amount correctable with the OIS function. When the correction capability of the interchangeable lens 200 is lower than the correction capability of the camera body 100, the OIS driver 221 performs the image stabilization for a remaining portion of the camera shake exceeding the magnitude Rb of the shake amount correctable with the BIS function.

Therefore, the interchangeable lens 200 can effectively utilize the image stabilizing function of the camera body 100 and the interchangeable lens 200.

The interchangeable lens 200 is attached to the camera body 100. The camera body 100 includes the CMOS sensor 110 and the sensor driver 181. The CMOS sensor 110 captures an object image formed via the interchangeable lens 200 to generate image data. The sensor driver 181 performs an image stabilization by moving the CMOS sensor 110 in a plane perpendicular to the optical axis. When the correction capability of the interchangeable lens 200 performing the image stabilization is higher than the correction capability of the camera body 100, the sensor driver 181 performs the image stabilization for a remaining portion of the camera shake exceeding the magnitude Ro of the shake amount correctable with the OIS function. When the correction capability of the interchangeable lens 200 is lower than the correction capability of the camera body 100, the sensor driver 181 performs the image stabilization within the magnitude Rb of the shake amount correctable with the BIS function.

Therefore, the camera body 100 can effectively utilize the image stabilizing function of the camera body 100 and the interchangeable lens 200.

Second Embodiment

A second embodiment will hereinafter be described with reference to the drawings. In the digital camera 1 according to the first embodiment, the shake correction amount in the case of the image stabilization using the BIS function is calculated by the BIS processor 183, and the shake correction amount in the case of the image stabilization using the OIS function is calculated by the OIS processor 223. On the contrast, in the digital camera 1 of the second embodiment, the shake correction amount is calculated by the CTL having a higher image stabilization capability in the BIS processor 183 and the OIS processor 223. The configuration of the digital camera 1 of this embodiment will hereinafter be described.

In the following description of the digital camera 1 according to this embodiment, the description of the same configuration and operation as the digital camera 1 according to the first embodiment will be omitted appropriately.

1. Configuration

Figure 14:
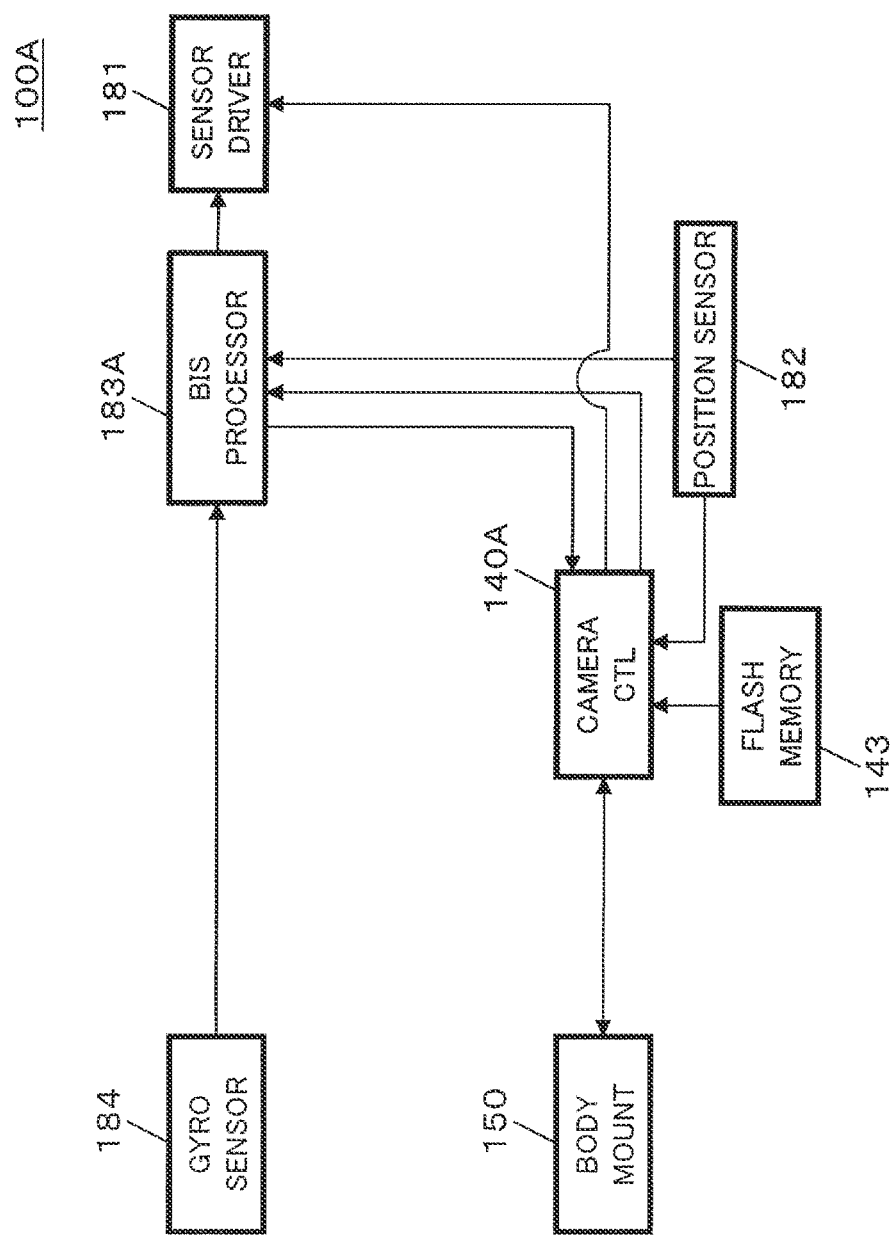
FIG. 14 is a diagram showing a configuration of the BIS processor of the digital camera according to a second embodiment.
Figure 15:
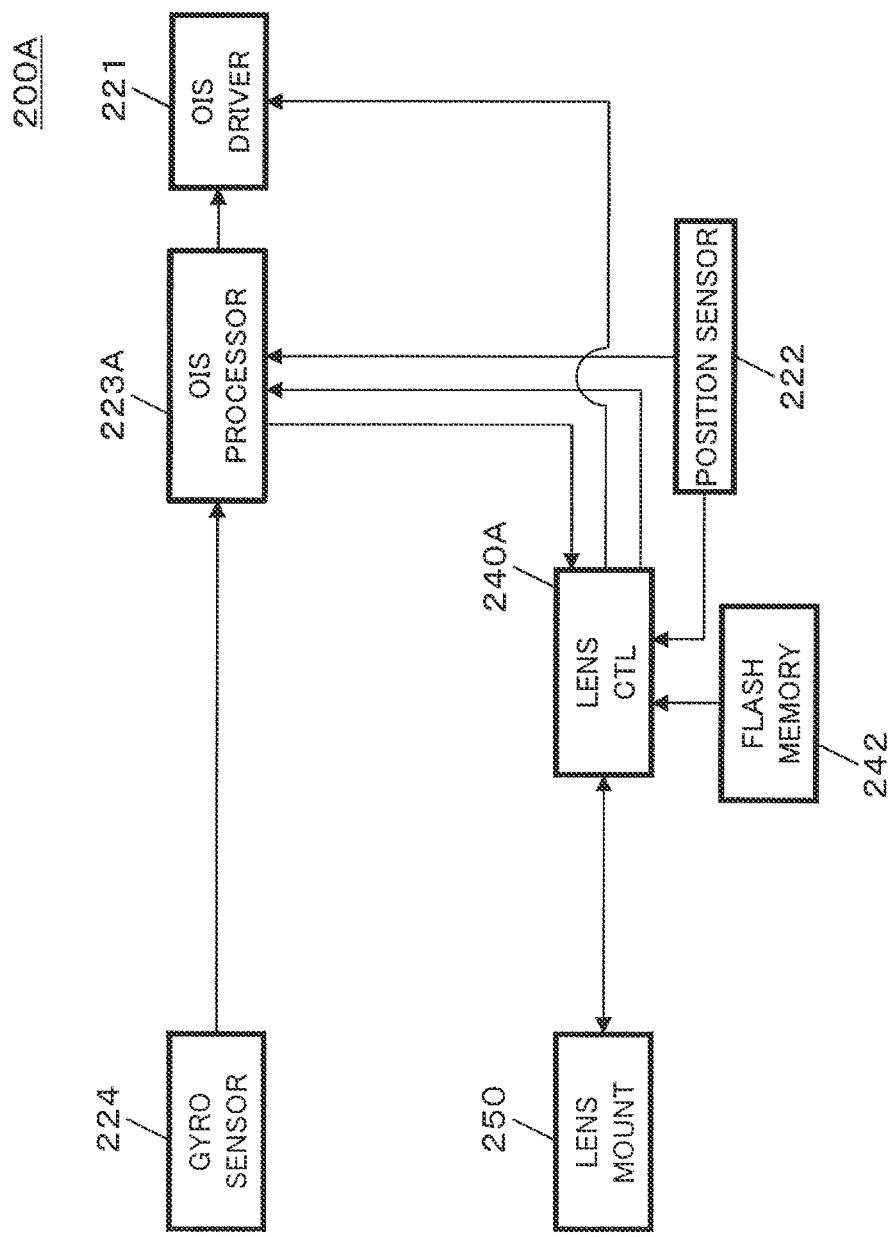
FIG. 15 is a diagram showing the configuration of the OIS processor of the digital camera.

The digital camera 1 of this embodiment includes a camera body 100A and an interchangeable lens 200A each capable of operating as a master/slave (described later in detail) for an image stabilizing operation in the configuration similar to the first embodiment. FIG. 14 is a diagram showing a configuration of the camera body 100A of the digital camera 1 according to this embodiment. FIG. 15 is a diagram showing a configuration of the interchangeable lens 200A.

In the camera body 100A of this embodiment, a BIS processor 183A is configured to have the same configuration as the BIS processor 183 of the first embodiment without including the subtractor 412 (FIG. 2). In the interchangeable lens 200A of this embodiment, the OIS processor 223A is configured to have the same configuration as the OIS processor 223 of the first embodiment without including the subtractor 310 (FIG. 3). In this embodiment, a camera CTL 140A and a lens CTL 240A can perform alternative calculations so as to control the BIS processor 183A and the OIS processor 223A.

In the embodiment, the CTLs 140A, 240A communicate various information with each other via the body mount 150 and the lens mount 250. The camera CTL 140A acquires various information from the position sensor 182 and the BIS processor 183 in real time at the image stabilization. Similarly, the lens CTL 240A acquires various information from the position sensor 222 and the OIS processor 223. The CTLs 140A, 240A may input angular velocity signals from the respective gyro sensors 184, 224.

2. Operation

Figure 16A:
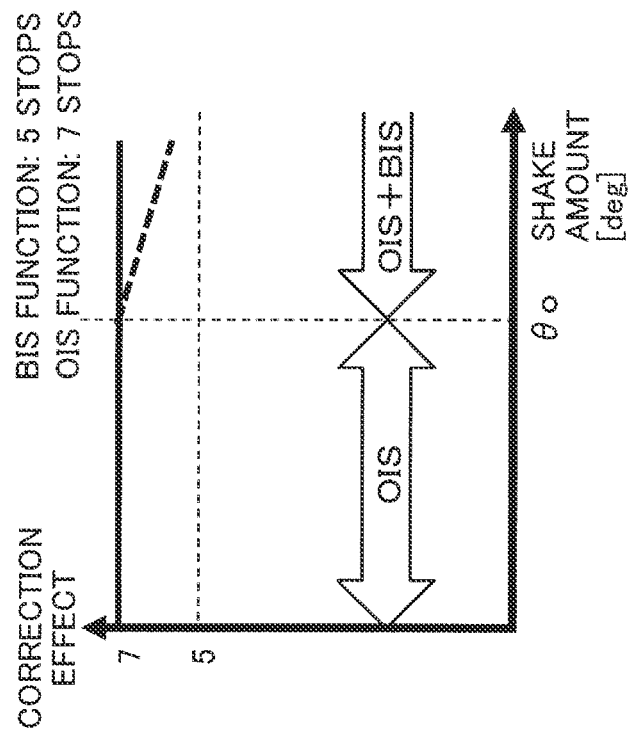
FIGS. 16A and 16B are diagrams for explaining an overview of an operation of the digital camera.
Figure 16B:
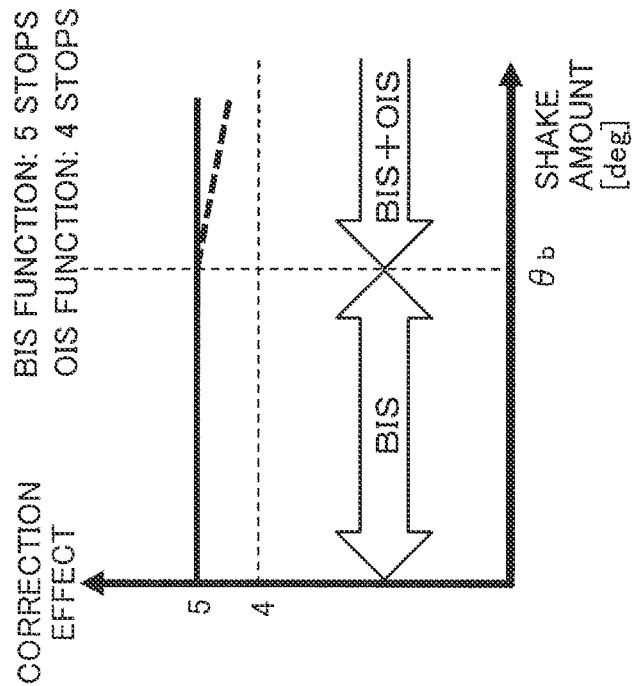

The operation of the digital camera 1 configured as described above will be described. FIGS. 16A and 16B are diagrams for explaining the operation of the digital camera 1 according to this embodiment. FIG. 16A illustrates the effect of the image stabilizing operation of this embodiment in the same case as FIG. 4A of the first embodiment. FIG. 16B illustrates the effect of the image stabilizing operation of this embodiment in the same case as FIG. 4C.

In the digital camera 1 of the first embodiment, the portion of the shake amount exceeding the maximum value θb of the shake amount correctable with the BIS function is calculated by using the processor 223, the gyro sensor 224, and the lens CTL 240 constituting the OIS function as shown in FIG. 4A, for example. On the contrast, in the digital camera 1 of this embodiment, the portion of the shake amount exceeding the maximum value θb is calculated by using the gyro sensor 184 and the camera CTL 140A constituting the BIS function. Therefore, the digital camera 1 of this embodiment corrects the portion exceeding the maximum value θb by using the gyro sensor 184 and the camera CTL 140A having a larger stop number, and thereby can obtain the effect corresponding to a higher image stabilization capability than the first embodiment in the portion of the shake amount exceeding the maximum value θb.

FIG. 16B shows alteration of the total stop number of the digital camera 1 when the interchangeable lens 200 having a greater stop number than the camera body 100 is connected to the camera body 100 as in FIG. 4C of the first embodiment. The digital camera 1 of this embodiment corrects the portion exceeding the maximum value θo by using the gyro sensor 224 and the lens CTL 240A having a larger stop number, and therefore can obtain the effect corresponding to a higher image stabilization capability than the first embodiment in the portion of the shake amount exceeding the maximum value θo.

The digital camera 1 of this embodiment selects one of the camera body 100A and the interchangeable lens 200A having a larger stop number as a master and causes the other to operate as a slave, in accordance with comparison between the BIS function and the OIS function as described above. The operation of the digital camera of this embodiment will hereinafter be described in detail.

2-1. Master and Slave Setting Operation

FIG. 17 is a flowchart showing a master and slave setting operation of the digital camera 1 of the second embodiment. The digital camera 1 of the first embodiment is set such that the function having a larger stop number is preferentially used between the BIS function and the OIS function (S104 and S105 of FIG. 5). Similarly, the digital camera 1 of this embodiment sets the CTL having a larger stop number as the master and sets the CTL having a smaller stop number as the slave between the BIS function and the OIS function, as the difference from the digital camera 1 of the first embodiment in that (S104A and S105A of FIG. 17).

2-2. Image Stabilizing Operation

Figure 18:
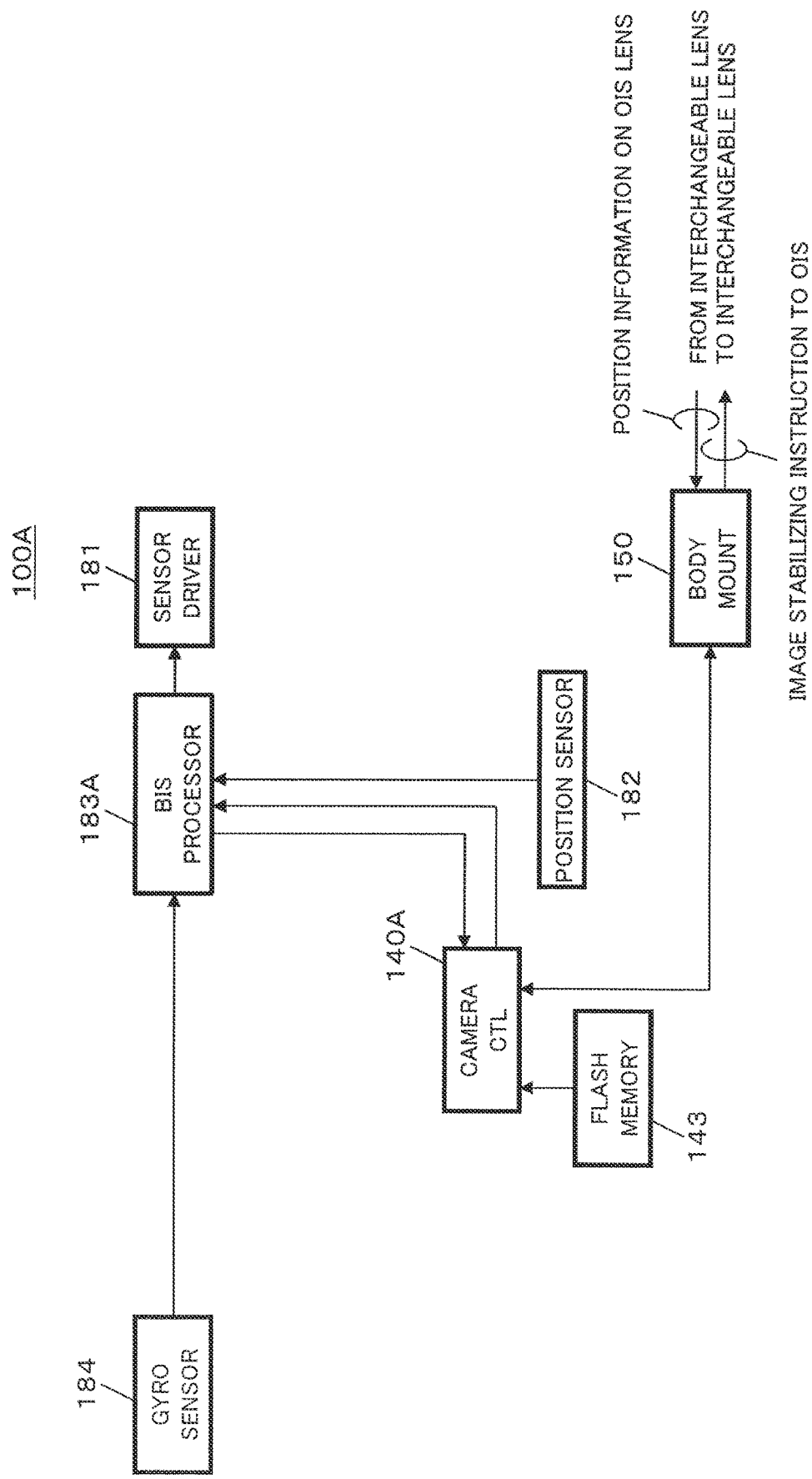
FIG. 18 is a diagram showing the camera body when the camera body is the master.
Figure 19:
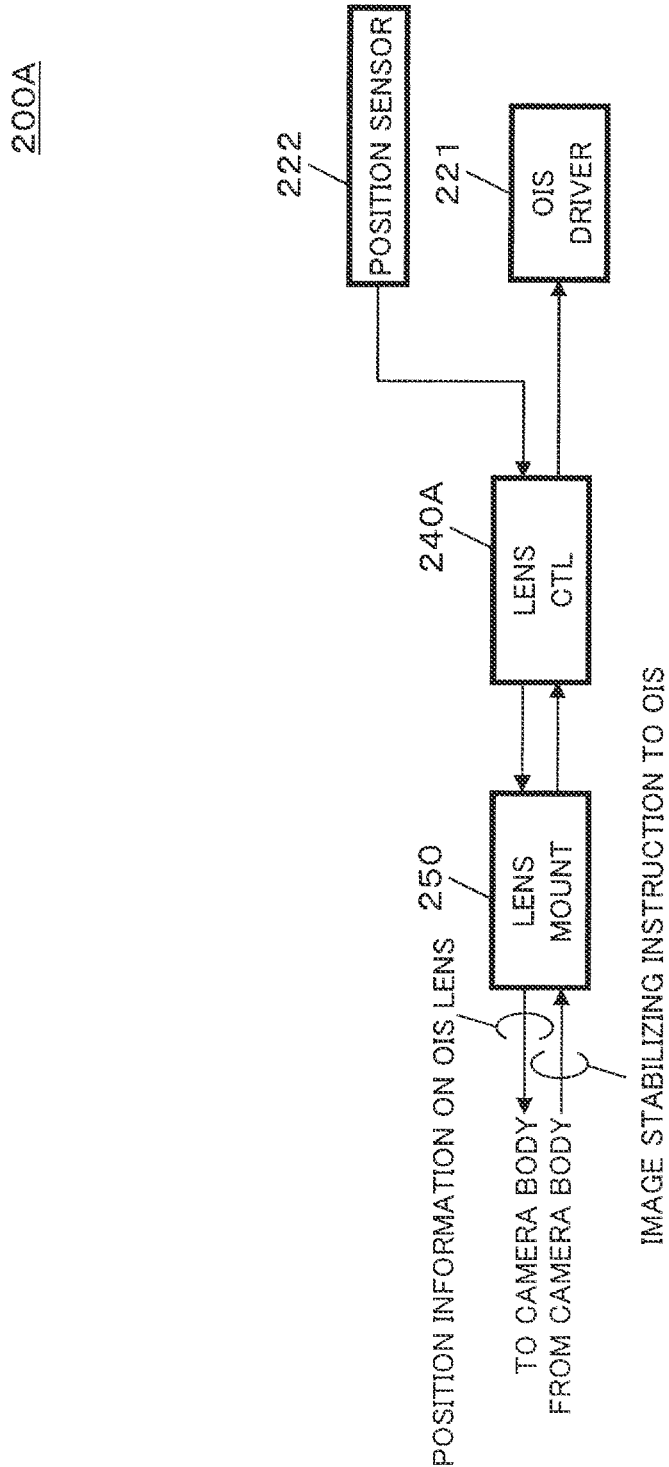
FIG. 19 is a diagram showing the interchangeable lens when the camera body is the master.

Hereinafter, FIGS. 18 and 19 illustrate the case where the camera body 100A is the master and the lens CTL 200A is the slave (S104A). The image stabilizing operation in the digital camera 1 in this case will be described below.

Figure 20:
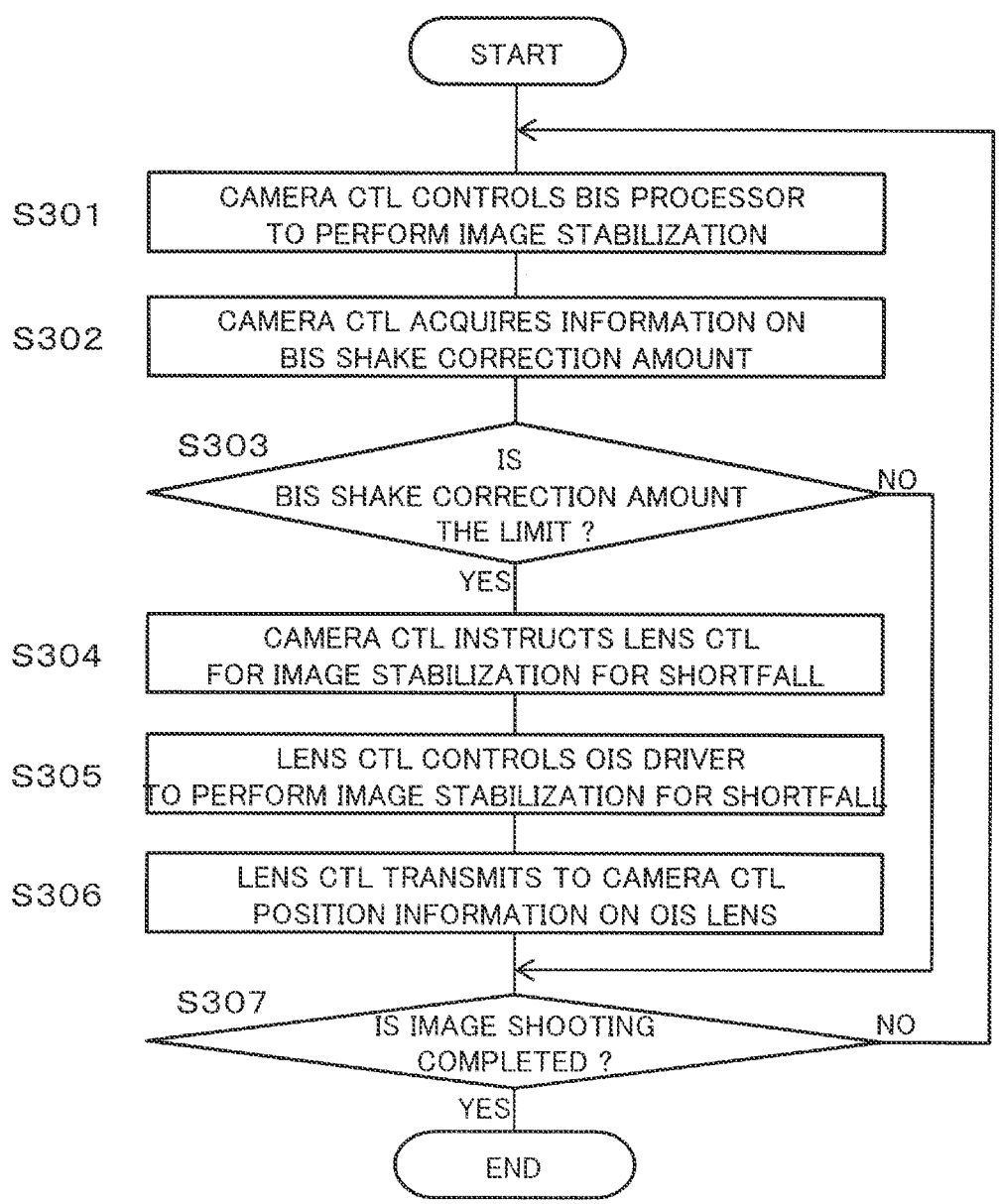
FIG. 20 is a flowchart showing the image stabilizing operation when the camera body is the master.

FIG. 20 is a flowchart showing the image stabilizing operation when camera body 100A is the master. The digital camera 1 of this embodiment performs the following operation in the same way as the flowchart of FIG. 12 of the first embodiment, for example.

At first, the camera CTL 140A in the camera body 100A causes the BIS processor 183A to perform the image stabilization (S301). The BIS processor 183A executes the calculation processing for the image stabilization as in step S201 of FIG. 12, for example.

The camera CTL 140A then acquires information indicative of the BIS shake correction amount from the BIS processor 183A (S302). The camera CTL 140A may calculate the same information based on the angular velocity signal from the gyro sensor 184.

The camera CTL 140A then determines whether the current shake amount exceeds the BIS correctable range Rb of the BIS function (S303). For example, referring to the BIS shake correction amount and information stored in the flash memory 143 of the camera body 100, the camera CTL 140 can perform a subtraction of an amount corresponding to the correctable range Rb from the current shake amount, so as to make the determination of step S303 according to the subtraction result. The determination of step S303 may be made as in step S203 of FIG. 9 of the first embodiment.

When it is determined that the shake amount exceeds the BIS correctable range Rb (YES at S303), the camera CTL 140A instructs the lens CTL 240A via the mounts 150, 250 to perform the image stabilization for a shortfall (S304). For example, the camera CTL 140A performs the subtraction described above to calculate the shortfall in the shake correction amount, which is included in the instruction for the image stabilization and transmitted to the lens CTL 240A.

The lens CTL 240A on the slave side then controls the OIS driver 221 (FIG. 19) in accordance with the instruction from the camera CRL 140A on the master side (S305). With this control, the OIS driver 221 drives the OIS lens 220 to perform the image stabilization for the shortfall. The control of the OIS driver 221 may be provided via the PID controller 311 in the OIS processor 223A.

The lens CTL 240A inputs a signal indicative of the position of the OIS lens 220 from the position sensor 222 as a correction result of the image stabilization by the OIS driver 221, and transmits the position information of the OIS lens 220 to the camera CTL 140A on the master side (S306).

When the image shooting is not finished, the camera CTL 140A returns to step S301 (NO at S307) and causes the BIS processor 183A to perform the image stabilization again by using the information received from the lens CTL 240A on the slave side (S301). For example, the camera CTL 140A performs feedback control of the BIS processor 183A such that the BIS shake correction amount is reduced by the OIS shake correction amount.

On the other hand, when it is determined that the shake amount does not exceed the BIS correctable range Rb (NO at S303), the camera CTL 140A continues the image stabilization using only the BIS function (S301). In this case, the camera CTL 140A may transmit, to the lens CTL 240A on the slave side, an instruction for not performing the shake correction using the OIS function.

According to the image stabilizing operation described above, the calculation of the shake correction amount is performed on the master side (the BIS processor 183A and the camera CTL 140A) having a higher correction capability (S301 to S304). For the shake correction amount exceeding the correctable range Rb, the OIS driver 221 on the slave side can be driven based on an instruction from the camera CTL 140A on the master side to compensate for the shortfall (S305). As described above, the image stabilization can accurately be performed.

Figure 21:
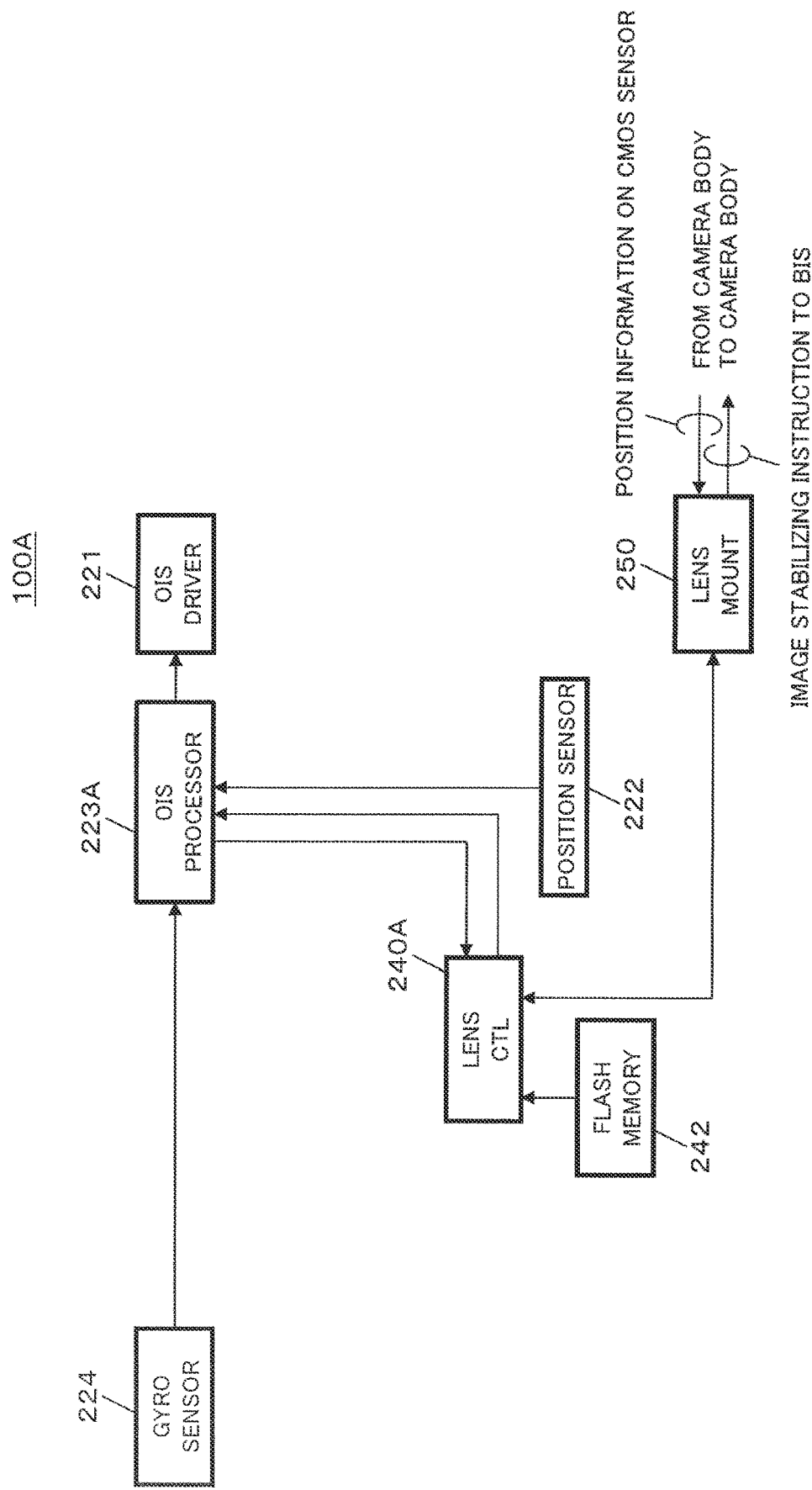
FIG. 21 is a diagram showing the interchangeable lens when the interchangeable lens is the master
Figure 22:
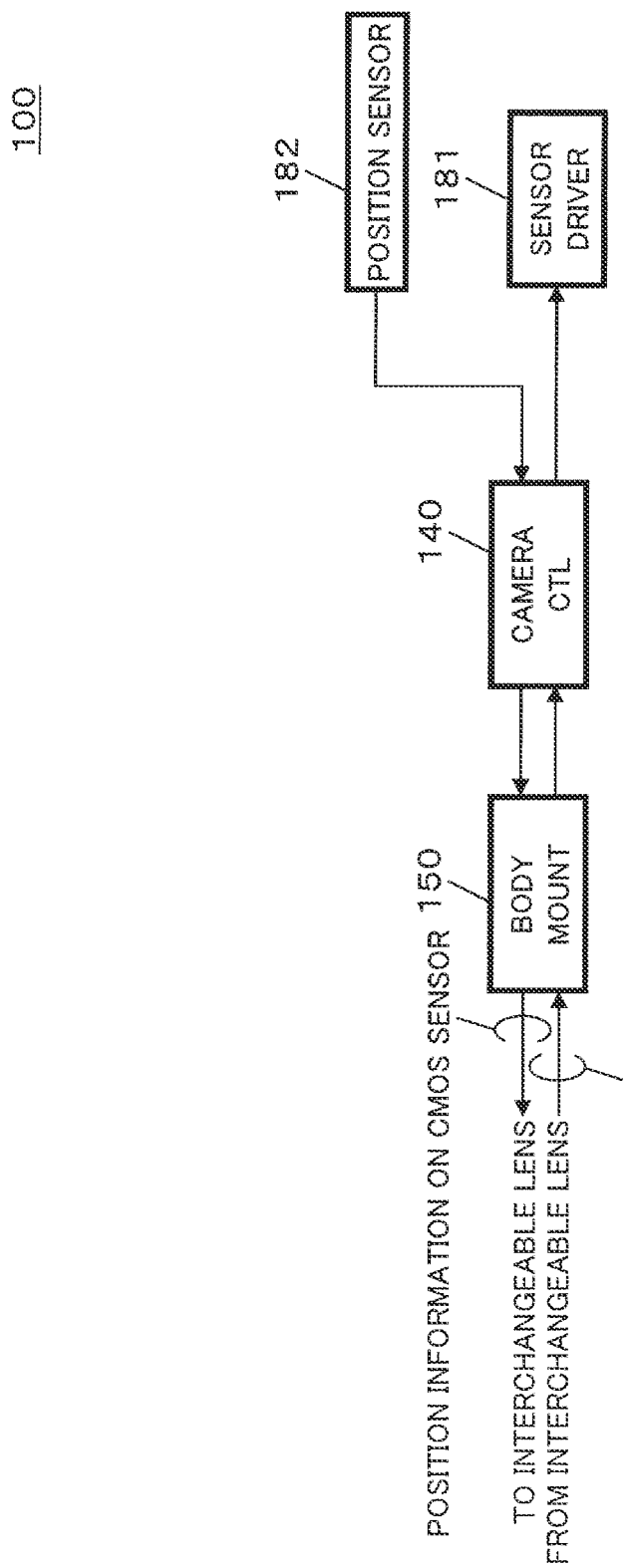
FIG. 22 is a diagram showing the camera body when the interchangeable lens is the master.
Figure 23:
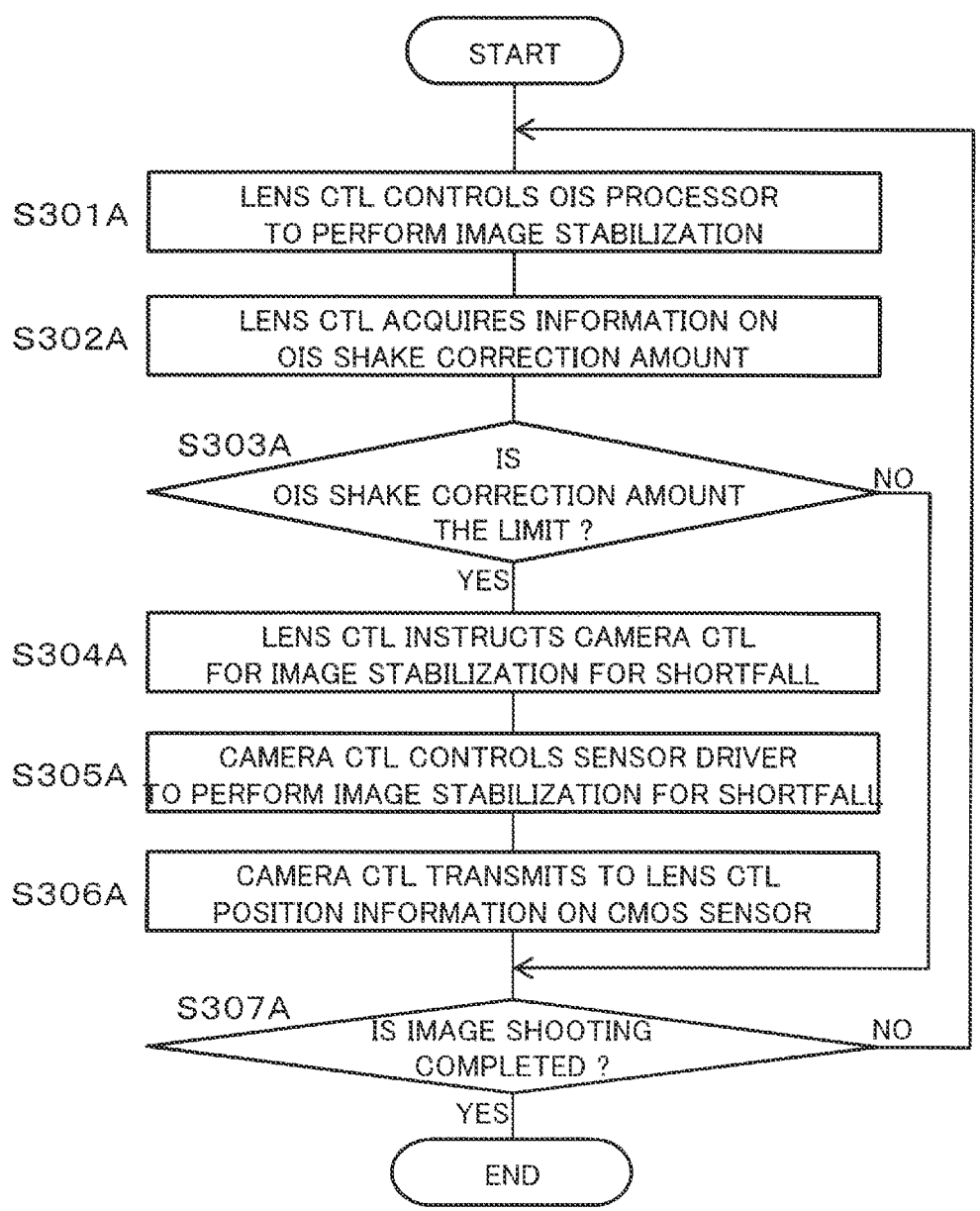
FIG. 23 is a flowchart showing the image stabilizing operation when the interchangeable lens is the master.

FIGS. 21 to 23 illustrate the case where the interchangeable lens 200A is the master and the camera body 100A is the slave. In this case, as shown in FIGS. 21 to 23, the roles are appropriately interchanged between the parts of the camera body 100A and the parts of the interchangeable lens 200A, and the image stabilizing operation is performed as in the case described above (FIGS. 18 to 20). Therefore, even when the correction capability of the interchangeable lens 200A is higher than the camera body 100A, the image stabilization can accurately be performed.

As described above, the interchangeable lens 200 of this embodiment includes the lens mount 250 (first communication interface) communicating with the camera body 100. The camera body 100 includes the body mount 150 (second communication interface) communicating with the interchangeable lens 200. The camera CTL 140 communicates with the lens CTL 240. One of the camera CTL 140 and the lens CTL 240 set as the master calculates a shake correction amount for the camera shake. When the camera shake exceeds the correctable range of the image stabilizing function on the master side, the master CTL transmits a shake correction amount corresponding to a remaining portion of the camera shake exceeding the size of the correctable range to the slave CTL.

Therefore, the digital camera 1 of this embodiment can transmit the camera shake correction instruction information from the master CTL to the slave CTL.

The slave CTL controls the camera shake correction by the driver on the slave side in accordance with the shake correction amount received from the master CTL and transmits the position information from the position sensor on the slave side to the master CTL.

Therefore, the digital camera 1 of this embodiment uses one of the camera body 100 and the interchangeable lens 200 having the higher image stabilization capability to calculate a shake correction amount corresponding to a remaining portion of the camera shake exceeding the size of one of the correctable ranges, so that the image stabilizing function of the camera body 100 and the interchangeable lens 200 can more effectively be used as compared to the digital camera 1 of the first embodiment.

OTHER EMBODIMENTS

As described above, the embodiments have been described as exemplification of the techniques disclosed in this application. However, the techniques in the present disclosure are not limited thereto and are also applicable to embodiments in which modifications, replacements, additions, omissions, and the like are appropriately made. Additionally, the constituent elements described in the first embodiment can be combined to provide a new embodiment.

In the first embodiment, the camera CTL 140 includes the function selector 142; however, the lens CTL 240 may include a function selector. In this case, the lens CTL 240 functioning as the function selector acquires the BIS performance information from the camera CTL 140, compares the stop number of OIS with the stop number of BIS, and sets the interchangeable lens 200 and the camera body 100 so that the function with a larger stop number is preferentially used.

In the first and second embodiments, the interchangeable lens 200 includes the zoom lens 210 and the zoom lens driver 211; however, the interchangeable lens 200 may not include the zoom lens 210 and the zoom lens driver 211.

When the image stabilization performance of the BIS function is the same as the image stabilization performance of the OIS function, the digital camera 1 of the first embodiment may preferentially use any image stabilizing function.

The digital camera 1 of the first embodiment performs the setting operation of the priority mode of FIG. 5 when the camera body 100 and the interchangeable lens 200 are connected, but not limited thereto. For example, the digital camera 1 may perform the setting operation of the priority mode when the camera is powered on.

At step S101 of FIG. 5, the function selector 142 of the first embodiment requests the OIS performance information from the lens CTL 240, and the lens CTL 240 transmits the OIS performance information to the function selector 142, but not limited thereto. For example, when detecting the connection between the camera body 100 and the interchangeable lens 200, the lens CTL 240 may transmit the OIS performance information to the function selector 142 without a request from the function selector 142.

In the second embodiment, the camera CTL 140 performs the master and slave setting operation; however, the lens CTL 240 may perform the setting operation. In this case, the lens CTL 240A acquires the BIS performance information from the camera CTL 140A, compares the stop number of OIS with the stop number of BIS, sets the CTL with the larger stop number as the master, and sets the CTL with the smaller stop number as the slave.

In the digital camera 1 of the second embodiment, when the image stabilization performance of the BIS function is the same as the image stabilization performance of the OIS function, either the camera body 100 or the interchangeable lens 200 may be set as the master.

In the digital camera 1 of the second embodiment, the master and slave setting operation of FIG. 17 is performed when the camera body 100 and the interchangeable lens 200 are connected, but not limited thereto. For example, the digital camera 1 may perform the operation when the camera is powered on.

At step S101A of FIG. 17, the camera CTL 140 of the second embodiment requests the information indicative of the OIS shake correction performance from the lens CTL 240, and the lens CTL 240 transmits the OIS performance information to the camera CTL 140, but not limited thereto. For example, when detecting the connection between the camera body 100 and the interchangeable lens 200, the lens CTL 240 may transmit the information indicative of the OIS shake correction performance to the camera CTL 140 without a request from the camera CTL 140.

The embodiments have been described as exemplification of the techniques in the present disclosure. The accompanying drawings and the detailed description have been provided for this purpose.

Therefore, the constituent elements described in the accompanying drawings and the detailed description may include not only the constituent elements essential for solving the problem but also constituent elements not essential for solving the problem so as to illustrate the techniques. Thus, even though these non-essential constituent elements are included in the accompanying drawings and the detailed description, these non-essential constituent elements should not immediately be recognized as being essential.

Since the embodiments described above are intended to illustrate the techniques in the present disclosure, various modifications, replacements, additions, omissions, and the like can be made within the claims and the scope equivalent thereto.

INDUSTRIAL APPLICABILITY

The idea of the present disclosure is applicable to electronic devices having an imaging function with an image stabilizing function (imaging apparatuses such as digital cameras and camcorders, portable phones, smartphones, and the like).

The invention claimed is:

1. An imaging apparatus comprising: an interchangeable lens; and a camera body, wherein
the interchangeable lens includes
a correction lens for correcting an image blur,
a lens driver performing an image stabilization by moving the correction lens in a plane perpendicular to an optical axis,
a first control circuitry controlling the image stabilization by the lens driver, and
a first communication interface communicating with the camera body, wherein
the camera body includes
an image sensor capturing an object image formed via the interchangeable lens to generate image data,
a sensor driver performing an image stabilization by moving the image sensor in a plane perpendicular to the optical axis,
a second control circuitry controlling the image stabilization by the sensor driver, and
a second communication interface communicating with the interchangeable lens, wherein
the first or second control circuitry selects one of the interchangeable lens and the camera body, in accordance with a level of correction capability to perform the image stabilization, a selected one being either the interchangeable lens or the camera body with higher level of the correction capability in the interchangeable lens and the camera body, wherein
one driver of the lens driver and the sensor driver performs the image stabilization for the image blur within a predetermined range, the one driver corresponding to the selected one, and wherein
the other driver corresponding to non-selected one performs the image stabilization for a remaining portion of the image blur exceeding the predetermined range wherein
one control circuitry of the first and second control circuitries calculates a blur correction signal for an image blur, the one control circuitry corresponding to the selected one, and the calculated blur correction signal driving the one driver, wherein when the image blur exceeds the predetermined range, the one control circuitry
- calculates a blur correction signal corresponding to a remaining portion of the image blur exceeding the predetermined range, the calculated blur correction signal corresponding to the remaining portion driving the other driver, and
- transmits, to the other control circuitry, the calculated blur correction signal corresponding to the remaining portion of the image blur exceeding the predetermined range, via the first and second communication interfaces, the calculated blur correction signal corresponding to the remaining portion being inputted to the other driver.

2. The imaging apparatus according to claim 1, wherein the control circuitry which performs the selection in the first and second control circuitries detects whether the image blur exceeds the predetermined range.

3. The imaging apparatus according to claim 1, wherein the other control circuitry controls the image stabilization by the other driver corresponding to the non-selected one, in accordance with the blur correction signal received from the one control circuitry, and transmits a result of the controlled image stabilization to the one control circuitry.

4. The imaging apparatus according to claim 1, further comprising a shake sensor detecting a shake of the camera body and/or the interchangeable lens, wherein
the first and/or second control circuitry controls the image stabilization based on a detection result of the shake sensor.

5. The imaging apparatus according to claim 1, wherein the predetermined range corresponds to a range in which the correction lens is movable by the lens driver or a range in which the image sensor is movable by the sensor driver.

6. The imaging apparatus according to claim 1, wherein the level of correction capability to perform the image stabilization is defined based on at least one of a follow-up residual for the shake correction signal calculated in the camera body or the interchangeable lens, and accuracy of camera-shake detecting angle information obtained from a gyro sensor provided in the camera body or the interchangeable lens.

7. The imaging apparatus according to claim 1, wherein the blur correction signal for the image blur is calculated based on a position of the correction lens or the image sensor, whichever corresponds to the selected one, and
the blur correction signal corresponding to the remaining portion of the image blur exceeding the predetermined range is calculated based on a position of the correction lens or the image sensor, whichever does not correspond to the selected one.

8. An interchangeable lens attachable to a camera body, comprising:
- a correction lens for correcting an image blur;
- a lens driver performing an image stabilization by moving the correction lens in a plane perpendicular to an optical axis;
- a control circuitry controlling the image stabilization by the lens driver; and
- a communication interface communicating with the camera body, wherein
in a case where a correction capability of the interchangeable lens to perform the image stabilization is higher than a correction capability of the camera body, the control circuitry calculates a blur correction signal for an image blur, and the lens driver performs the image stabilization within a first predetermined range with the calculated blur correction signal driving the lens driver, wherein when the image blur exceeds the first predetermined range, the control circuitry
- calculates a blur correction signal corresponding to a remaining portion of the image blur exceeding the first predetermined range, the calculated blur correction signal corresponding to the remaining portion driving a sensor driver in the camera body, and
- transmits, to the camera body, the calculated blur correction signal corresponding to the remaining portion of the image blur exceeding the first predetermined range, via the communication interface, the calculated blur correction signal corresponding to the remaining portion being inputted to the sensor driver, and in a case where the correction capability of the interchangeable lens is lower than the correction capability of the camera body, the lens driver performs the image stabilization for a remaining portion of an image blur exceeding a second predetermined range.

9. A camera body with an interchangeable lens being attachable thereto, comprising:
- an image sensor capturing an object image formed via the interchangeable lens to generate image data;
- a sensor driver performing an image stabilization by moving the image sensor in a plane perpendicular to the optical axis;
- a control circuitry controlling the image stabilization by the sensor driver; and
- a communication interface communicating with the interchangeable lens, wherein
in a case where a correction capability of the interchangeable lens to perform the image stabilization is higher than a correction capability of the camera body, the sensor driver performs the image stabilization for a remaining portion of an image blur exceeding a first predetermined range, and
in a case where the correction capability of the interchangeable lens is lower than the correction capability of the camera body, the control circuitry calculates a blur correction signal for an image blur, and the sensor driver performs the image stabilization within a second predetermined range with the calculated blur correction signal driving the sensor driver, wherein when the image blur exceeds the second predetermined range, the control circuitry
- calculates a blur correction signal corresponding to a remaining portion of the image blur exceeding the second predetermined range, the calculated blur correction signal corresponding to the remaining portion driving a lens driver in the interchangeable lens, and
- transmits, to the interchangeable lens, the calculated blur correction signal corresponding to the remaining portion of the image blur exceeding the second predetermined range, via the communication interface, the calculated blur correction signal corresponding to the remaining portion being inputted to the lens driver.

* * * * *